United States Patent [19]

Tone et al.

[11] Patent Number: 5,596,493
[45] Date of Patent: Jan. 21, 1997

[54] METHOD FOR CLASSIFYING SALE AMOUNT CHARACTERISTICS, METHOD FOR PREDICTING SALE VOLUME, METHOD FOR ORDERING FOR RESTOCKING, SYSTEM FOR CLASSIFYING SALE AMOUNT CHARACTERISTICS AND SYSTEM FOR ORDERING FOR RESTOCKING

[75] Inventors: Kaoru Tone, 23-4, Nakamachi 4-chome, Machida-city, Tokyo; Michiko Tone, Machida; Hiroyuki Tanaka, Kamagaya; Toshikazu Okazaki, Tokyo, all of Japan

[73] Assignees: Meiji Milk Products Co., Ltd.; Kaoru Tone, Tokyo, Japan

[21] Appl. No.: 956,779

[22] PCT Filed: Apr. 17, 1992

[86] PCT No.: PCT/JP92/00495

§ 371 Date: Dec. 17, 1992

§ 102(e) Date: Dec. 17, 1992

[87] PCT Pub. No.: WO92/18939

PCT Pub. Date: Oct. 29, 1992

[30] Foreign Application Priority Data

Apr. 19, 1991 [JP] Japan ................. 3-115662

[51] Int. Cl.⁶ ................................. G06F 153/00
[52] U.S. Cl. ................................. 395/210
[58] Field of Search ................. 364/403, 404, 364/405, 401, 400; 235/375–385

[56] References Cited

U.S. PATENT DOCUMENTS

| | | | |
|---|---|---|---|
| 3,876,863 | 4/1973 | Boone | 235/61.7 R |
| 4,025,766 | 5/1977 | Ng et al. | 235/152 |
| 4,355,372 | 10/1982 | Johnson et al. | 364/200 |
| 4,521,677 | 6/1985 | Sarwin | 235/385 |
| 4,771,383 | 9/1988 | Takahashi | 364/405 |
| 4,825,045 | 4/1989 | Humble | 235/383 |
| 4,833,308 | 5/1989 | Humble | 235/383 |
| 4,833,608 | 5/1989 | Aya | 364/404 |
| 4,843,546 | 6/1989 | Yoshida et al. | 364/403 |
| 4,920,488 | 4/1990 | Filley | 364/403 |
| 4,951,196 | 8/1990 | Jackson | 364/401 |
| 4,953,113 | 8/1990 | Chadima, Jr. et al. | 364/708 |
| 4,972,504 | 11/1990 | Daniel, Jr. et al. | 455/2 |
| 5,101,352 | 3/1992 | Rembert | 364/401 |
| 5,128,861 | 7/1992 | Kagami et al. | 364/403 |
| 5,168,445 | 12/1992 | Kawashima et al. | 364/403 |
| 5,315,093 | 5/1994 | Stewart | 235/381 |

OTHER PUBLICATIONS

Ditro Forecasting 1.1; Jan. 1974; Dialog Acc#1254553.
IMREX Demand Forecasting System; 1984; Dialog Acc#01016166.
Ooba et al; Jun. 7, 1989; Patent Abstracts of Japan; #01–145765 The Number Of Customers and Sales Predicting System.
Nikkei Computer, Nov. 15, 1982, "Pos New Age? To A General Information Management", pp. 48–61.

(List continued on next page.)

*Primary Examiner*—Donald E. McElheny, Jr.
*Assistant Examiner*—Hayward A. Verdun
*Attorney, Agent, or Firm*—Limbach & Limbach L.L.P.

[57] ABSTRACT

POS data are entered at step S1. The input POS data are arranged and those data for a day on which there was no stock at the store opening time and for a day on which the goods are out of stock at the store closure time are discarded to formulate data sets of the daily sale amounts for individual goods. At step S3, non-routine goods are discarded. At step S4, basic statistic values of the goods, such as mean value, standard deviation, maximum value, minimum value, skewness value, kurtosis value, Geary value etc. of the daily sale amounts of the goods are calculated. At step S5, the goods are classified into one of preset plural types, such as Poisson type, normal type, causal type and other type. Besides, an optimum amount for restocking order is found on the basis of the class types.

16 Claims, 7 Drawing Sheets

OTHER PUBLICATIONS

Measurement and Control, vol. 28, No. 1, Jan. 1989, "Sales Analysis", pp. 17–22, Information System Strategy by Pos, pp. 37–42.

Fujitsu, vol. 41, No. 1, Jan. 1990, "Support System for Decision–Making of Marketing: Manasus", pp. 54–60.

Fujitsu, vol. 36, No. 3, May 1985, "Sauler Office's General System Using Sales Terminals in Prima Meat Packers, Ltd." pp. 217–223.

Kei Takeuchi, "Mathematical Statistics", Jul. 1963, Toyo Keizai Shinpo Shia (Tokyo).

Snyder, R. D.; "Inventory Control with Gamma Probability Distribution"; European Dialog File (15) Journal of Operational Research, v. 17 n3 Abstract only; Sep. 1984; 00256246.

Nelson, Stephen L; "Determining reorder points . . . "; Lotus v. 6 n6 p. 50; Jun. 1990; Dialog file 275 #01361134.

Schwartz; David J; Marketing Today A Basic Approach; 1981; pp. 472–481.

Tashman, Leonard J & Kathleen R Lamborm; 7 The Ways & Means of Statistics; 1979 pp. 5–46 & 49–54.

*22b*

```
JAN  :  4902705000506

1000CC

NUMBER OF            8
 STOCKED GOODS :

DEMAND PREDICTION    3 2

ORDERING MINIMUM     6 ×
UNIT PRICE :

DEFINITE :           24
```

FIG. 8

METHOD FOR CLASSIFYING SALE AMOUNT CHARACTERISTICS, METHOD FOR PREDICTING SALE VOLUME, METHOD FOR ORDERING FOR RESTOCKING, SYSTEM FOR CLASSIFYING SALE AMOUNT CHARACTERISTICS AND SYSTEM FOR ORDERING FOR RESTOCKING

TECHNICAL FIELD

This invention relates to a method for classifying sale amount characteristics, a method for predicting the sale volume, a method for ordering for restocking, a system for classifying sale amount characteristics and a system for ordering for restocking, designed for classifying sale amount characteristics of individual goods and predicting the sale amount. More particularly, it relates to a method for classifying sale amount characteristics, a method for predicting the sale amount, a method for ordering for restocking, a system for classifying sale amount characteristics and a system for ordering for restocking whereby the sale amount may be predicted easily with high accuracy by statistic analyses.

BACKGROUND ART

The sale amounts of individual articles of commerce or goods may be recited as important information for store management. The sale amounts of individual goods significantly influence the laying-in quantity of articles and inventory and hence the store management.

Thus the chief or manager of a store is concerned with how to predict the inventory and the laying-in quantity for tomorrow, one week ahead or one month ahead, and formulates a daily, weekly or monthly schedule based on such estimation or prediction of the sale amounts.

That is, if the sale amounts of the individual articles could be estimated with more or less precision, it becomes possible to map out a plan for stocking a proper quantity of articles or to maintain proper inventory with certain efficacy to contribute to cost saving or efficient store management.

At present, sale amount estimation by a store or chief is generally unscientific and inaccurate because it is made in a majority of cases based on experiences, that is, by taking account of various factors possibly influencing the sale volume of the individual articles, such as day of the week, entertainments, weather, temperature, distribution of advertisements or price changes.

However, an advanced artifice in mathematical statistics and analytic skill are required if sale volume estimation is to be made by scientific methods. If, for example, a pre-existing statistic software is used, since computer software packages now on the market are intended for expert users and sold as a software package premised on general application, such as a statistic package or a multi-variable analytic package, the operation is specialized and difficult while it is necessary to employ plural packages in combination. Consequently, it is very difficult for an amateur having no specialized knowledge in statistics, such as store foremen or manager, to master the packages easily. If a model formulation for sale volume estimation of individual articles is left to specialized consultants, it is necessary to take account of the difference in postulates from store to store or modifications imposed by environmental changes for one and the same store. Besides, model maintenance is also difficult to achieve and, if such maintenance is neglected, estimation accuracy is necessarily lowered because of failure in model adaptation.

The JP Patent KOKAI Publication 2-155067 discloses an inventory warning method and system for estimating the sale progress for each article, finding an index for evaluating inventory surplus or deficit at the current time based on the estimated results, and rearraying the information concerning the articles based on the indices, as well as deciding validity of the information concerning the articles based on the hysteresis of measures taken in connection with the inventory or the contents of contracts with customers. This prior-art method, however, lacks in statistical analyses, and is simply based on transition patterns as found from the relation between the time and the total sale volume ratio. On the other hand, estimation is not fully automated because estimation of the sale volume as a function of weather or possible entertainments is subject to decisions by store foremen.

Besides, store personnel not having a specialized knowledge in statistics frequently are unable to become aware of the fact that certain factors possibly influencing the sale volume of individual articles could be utilized as statistic causals. Next, possible causal types cannot be enumerated without considerable difficulties. In addition, it is extremely difficult for an amateur to give a correct judgment as to which of the causals enumerated could actually influence the sale volume (testing or verification of significance of causals). The result is that important causals tend to be disregarded or causals irrelevant to estimation tend to be taken into account to lower the estimation accuracy.

On the other hand, orders for restocking or replenishment are placed on the basis of the state of inventory or inspiration or experiences of the personnel in charge of ordering. Thus the inventory management is an operation in need of skill and depends of dexterity on the personnel in charge of placing restocking orders.

Meanwhile, under the present state of shortage in manpower, the operation of placing orders for replenishment is frequently taken charge of by unskilled operators of part-time workers, which leads to inefficient inventory management.

In view of the above-depicted status of the art, it is an object of the present invention to provide a method for classifying sale amount characteristics, a method for estimating the sale amount, a method for ordering for restocking, a system for classifying sale amount characteristics and a system for ordering for restocking, whereby the sale volume of individual articles may be easily predicted by automatically classifying characteristics of the individual articles, and whereby sale amount characteristics of individual articles may be classified and estimated responsive to differences in postulates from store to store or modification of estimation formula accompanying environmental changes to enable optimum ordering for restocking based on the estimated sale amount of the individual articles.

DISCLOSURE OF THE INVENTION

The method for classifying sale amount characteristics according to the present invention is proposed for accomplishing the above object and at least comprises the steps of entering POS data, finding sale amount data of individual goods for a predetermined time period obtained on the basis of the POS data, calculating basic statistic values of daily sale amounts of the individual goods based on the sale amount data of the individual goods, and classifying the data of the basic statistic data into one of plural class types.

Prior to calculation of the above-mentioned basic statistic values, it is preferred to discard data of individual goods on a day on which there was no stock from the outset at the time of store opening and on a day on which the goods are depleted at the time of store closure, data of non-routine goods, that is goods not displayed routinely, and data of out-of-sale goods from data of sale amounts of the individual goods. Among the basic statistic values, there are a mean value, standard deviation, maximum value, minimum value, skewness value, kurtosis value, a Geary value, etc. Among the preset class types, there are preferably a Poisson type, normal type, causal type and other type not belonging to these three types. The normal type may be at least any of the normal type, normal 1000 type, lognormal type and lognormal 1000 type. The goods of the causal type are preferably analyzed based on a linear or log-linear regression formula.

With the method for estimating the sale amounts according to the present invention, the above-mentioned object is achieved by estimation in accordance with the class types resulting from the above-mentioned method for classifying the sale amount characteristics.

The method for ordering for restocking according to the present invention is proposed for achieving the above object, and at least comprises the steps of entering POS data, finding sale amount data of individual goods for a predetermined time period obtained on the basis of the POS data, calculating basic statistic values of daily sale amounts of the individual goods based on the sale amount data of the individual goods, classifying the data of the basic statistic data into one of plural class types, estimating the sale amount in accordance with the class types and calculating the amount of a restocking order based on the estimated sale amount and an amount on stock.

The amount of the restocking order is calculated based on carry-over obtained by subtracting a scrapped amount from the remainder of the individual goods, the estimated sale amount and a safety stock amount. Inventory simulation is carried out for plural values of the safety stock amounts and an optimum safety stock amount is calculated from the results of the inventory simulation.

The system for classifying sale amount characteristics according to the present invention at least comprises means for entering POS data, means for finding sale amount data of individual goods for a predetermined time period obtained on the basis of the POS data, means for calculating basic statistic values of daily sale amounts of the individual goods based on the sale amount data of the individual goods, and means for classifying the data of the basic statistic data into one of preset plural class types.

With the system for classifying sale amount characteristics, it is possible to discard data of individual goods on a day on which there was no stock from the outset for the goods at the time of store opening and on a day on which the goods are depleted at the time of store closure, data of non-routine goods, that is goods not displayed routinely, and data of out-of-sale goods, from data of sale amounts of the individual goods, prior to calculation of the above-mentioned basic statistic values. Among the basic statistic values, there are, for examples the mean value, standard deviation, maximum value, minimum value, skewness value, kurtosis value, and the Geary value, etc. Among the preset class types, there are, for example, the Poisson type, normal type, causal type and the other type not belonging to these three types. The normal type may be at least any of the normal type, normal 1000 type, lognormal type and lognormal 1000 type. The goods of the causal type may be analyzed based on linear or log-linear regression formulas. A computer terminal for entering the POS data, data of individual goods for a day on which the goods were not on stock at the time of store opening and data of individual goods for a day on which the goods were depleted at the time of store closure, and data of non-routine goods that is goods not displayed routinely and data of out-of-sale goods, may be provided in each of the stores, and the above-mentioned classifying means may be provided in a host computer used for collectively controlling these data from respective stores.

The system for ordering for restocking according to the present invention is proposed to achieve the above object and at least comprises means for entering POS data, means for finding sale amount data of individual goods for a predetermined time period obtained on the basis of the POS data, means for calculating basic statistic values of daily sale amounts of the individual goods based on the sale amount data of the individual goods, means for classifying the data of the basic statistic data into one of plural class types, means for estimating the sale amount in accordance with the class types and means for calculating the amount of a restocking order based on the estimated sale amount and an amount on stock.

With the above-described system for ordering for restocking, a variety of processing operations, such as arranging the data of sale amounts for the individual goods and classification of the goods into preset class types based on calculation of basic statistic values, are carried out before calculation of the basic statistic values for calculating the amounts of the restocking orders based on the stock amounts and predicted sale amounts of the individual goods. Besides, with the present system for ordering for restocking, inventory simulation based on plural presupposed safety stock amounts is carried out and the amount of optimum safety stock amount is set for ordering for restocking based on the results of the inventory simulation.

Besides, with the present system for ordering for restocking, means for calculating the amount of a restocking order is provided in a handy terminal adapted for inputting a stock amount of each individual goods, data of the estimated sale amount from the means for estimating the sale amount are transmitted to the means for calculating the amount of the restocking order for calculating the amount of the restocking order, and the results of calculation are displayed on a display part of the handy terminal.

Predicted sale amounts may be found using a recording medium on which there are recorded at least a program portion for finding data of a sale amount of individual goods for a preset, period on the basis of input POS data, a program portion for calculating basis statistic values of daily sale amounts of individual goods and a program portion for classifying data of said basic statistic values into plural preset class types, while amounts of restocking orders may be found using a recording medium on which there are recorded a program portion for entering POS data, a program portion for finding sale amount data of individual goods for a preset period on the basis of input POS data, a program portion for calculating basic statistic values of daily sale amounts of individual goods, a program portion for classifying data of said basic statistic values into plural preset class types, a program portion for finding a regression formula for estimating sale amounts in accordance with the class types and said regression formula.

By calculating the basic statistic values of the daily sale amounts of the individual goods from the data of the sale amounts of the individual goods based on the POS data, and classifying the data of the basic statistic values into plural preset class types, it becomes possible to characterize goods and to make estimation of the sale amounts as well as to effect laying-in of goods or inventory control according to these class types. Precision of the results of class type analyses may be improved by discarding data for a day on which there was no stock from the outset for the goods at the time of store opening and data on which the goods are depleted at the time of store closure, data of non-routine goods and data of goods not on sale, from the data of sale amounts, prior to calculation of the basic statistic values. If the Poisson type is used as the class type, it becomes possible to find the probability of the number of sold goods and to know what is the good that sells most stably without being influenced by causals. If the normal type is used as the class type, it becomes possible to know the mean sale amount of the goods and the sale characteristics, such as sale variance, as well as the probability of the sale amounts. Also, if the causal type is used as the class type, it becomes possible to predict the sale amounts of the goods. More precise classification may be made by having at least the normal type, normal 1000 type, lognormal type and lognormal 1000 type included in the normal type, whilst, more precise analyses may be achieved by analyzing the goods of the causal type based on a linear or log-linear multiple regression formula.

Although these operations may function not only with the method for classifying sale amount, characteristics but also with the system for classifying sale amount characteristics, the system for classifying sale amount characteristics, above all may be constructed more efficiently and economically in its entirety by providing the classification means at a computer center for collectively controlling the information supplied from the respective stores or at a host computer installed at a main office, and by providing a terminal capable of entering POS data in each store. The predicted amount of demand may be calculated at the input terminal based on the results of classification and the sale characteristics at the classification system and a restocking order may be easily made by setting the difference between the predicted amount of demand and the current amount of stock as an amount of the restocking order.

It is seen from above explanation that, by finding the data of sale amounts of the individual goods for a preset period based on the POS data, calculating basic statistic values of the daily sale amounts of the individual goods based on the sale amount data and by classifying the data of the basic statistic values into one of preset plural class types, in accordance with the method for classifying sale amount characteristics, method for predicting the sale amount method for placing a restocking order, system for classifying the sale amount characteristics and the system for placing a restocking order, according to the present invention, the sale amounts of the individual goods may be automatically classified and estimated easily, while the sale amounts of the individual goods may be predicted with high precision to conform to modification of the prediction formula as a function of differences in store postulates or environmental changes from store to store, so that an optimum safety stock amount may be set by the inventory simulation based on the above-mentioned classification and prediction. Above all, by running a program of the above-mentioned recording medium on a computer provided in each store to display the results of simulation of the optimum safety stock amount based on the information supplied from the handy terminal, it becomes possible to perform efficient ordering for restocking.

BRIEF DESCRIPTION OF THE DRAWINGS

FIG. 8 shows minimum typical items to be displayed on a data display terminal of the handy terminal.

BEST MODE FOR CARRYING OUT THE INVENTION

Figure 1:
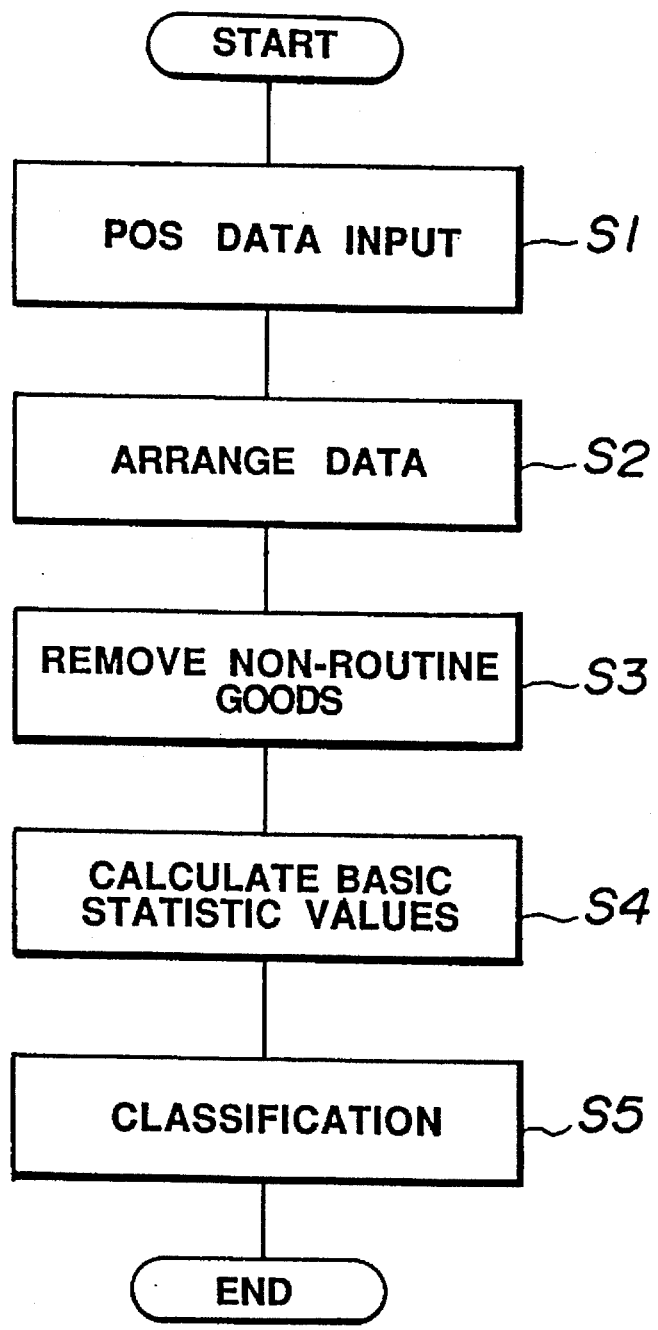
FIG. 1 is a flow chart for a method for classifying sale amount characteristics embodying the present invention.

Referring to the drawings, a method and a system for classifying sale amount characteristics embodying the present invention will be explained in detail.

FIG. 1 shows, in a flow chart, an embodiment of the method for classifying sale amount characteristics according to the present invention. At step S1 of the flow chart of FIG. 1, point-of-sale (POS) data for individual goods are entered.

At step S2, sale volume data of individual goods for a preset time period is found based on the POS data. That is, the daily sale amount per individual article is summed from the POS data to formulate a daily sale amount data set for each individual article. When formulating the sale amount data set, data of the individual articles for a day(s) on which the articles are not on stock when the store was opened and data of the individual articles for a day(s) on which the articles were depleted when the store was closed, are desirably discarded in advance. The former data are to be discarded because it is necessary to distinguish a day on which the article really was not sold from a day on which the article was not sold because of the article being out of stock from the outset. The latter data are to be discarded because the sale volume may possibly be affected by the article being out of stock. In this manner, with the embodiment illustrated, these abnormal days are previously discarded because the presence of these abnormal days aggravates the accuracy of the analytic results of the basic statistic analyses to be described later. However, there may be occasions wherein these days can be detected as being abnormal days from the basic statistic analyses carried out in step S4 as later described. Thus it is possible to discard data of the abnormal day(s) at this stage to proceed again to basic statistic analyses.

At step S3, data of the non-routine goods, that is goods not displayed regularly, and data of articles not on sale, are removed from the sale volume data of the individual articles.

At step S4, basic statistic values of the daily sale volume of the individual articles are calculated on the basis of the above-mentioned sale volume data of the individual articles. Among the basic statistic values, there are, for example, mean values, standard deviation, maximum values, minimum values, skewness values, Geary values, etc.

Figure 2:
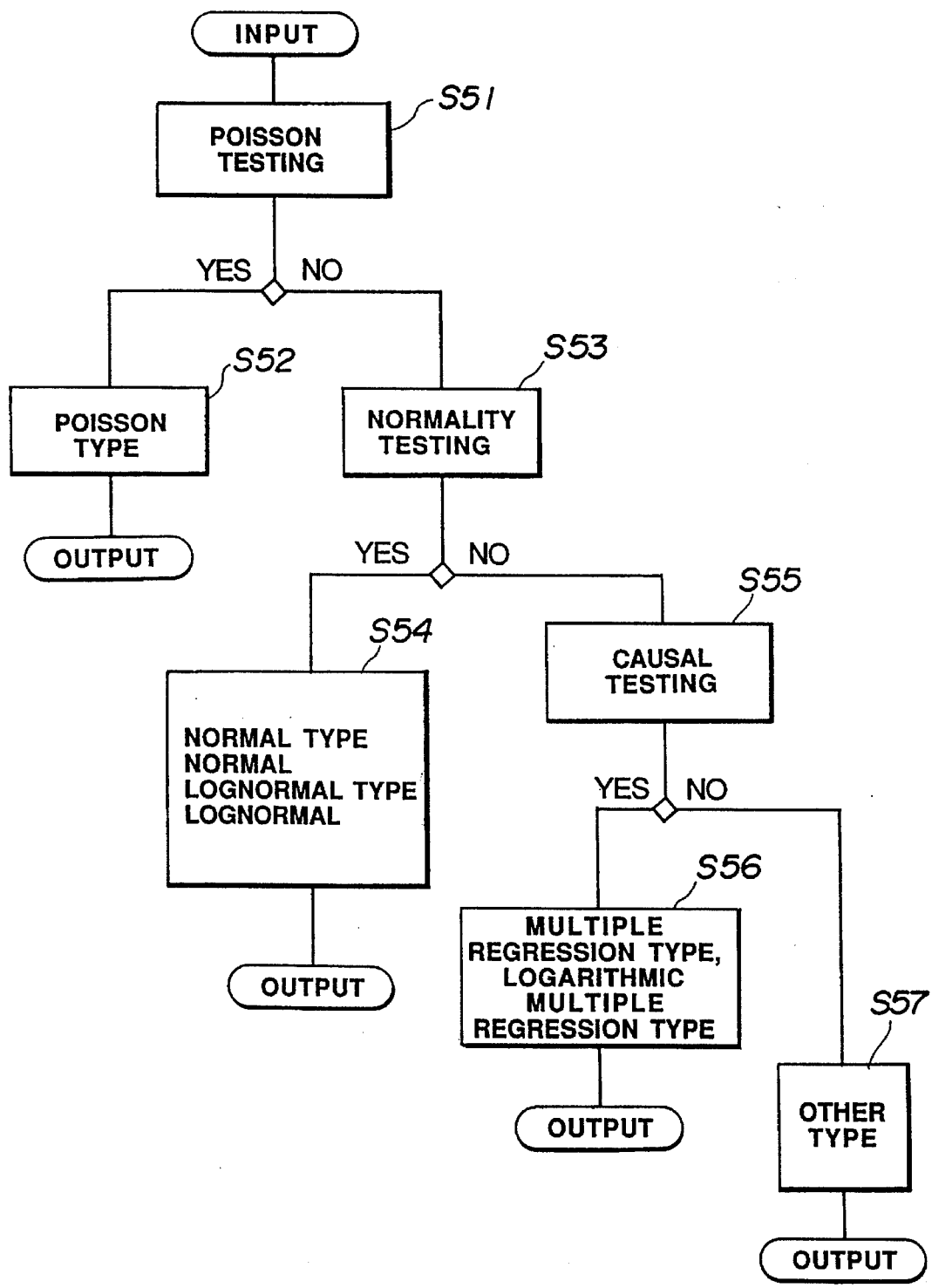
FIG. 2 is a detailed flow chart for the classifying process.

At step S5, the above-mentioned statistic data are classified into preset class types. Among these class types, there are a Poisson type, a normal type, a causal type and a type not belonging to any of these types. FIG. 2 shows details of the flow chart for the above-described classifying operation at step S5.

Referring to the flow chart of FIG. 2, it is statistically tested if the sale amount distribution is the Poisson distribution having a mean value m. To this end, an effective statistic technique, such as a chi-square testing, is employed. If the distribution is found to be the Poisson type distribution at step S51 (YES), control passes to step S52 where the mean value m is accepted as the characteristic value for the article. The distribution which is not found to be of the Poisson type by testing but which is found to be of the Poisson type on second testing after discarding a very small number of the abnormal data, is also accepted as being of the Poisson type. Meanwhile, the Poisson type distribution frequently is found with articles having a rather small value, such as seven or less, of the mean value m.

If the distribution is not accepted to be of the Poisson type at step S51, control proceeds to step S53 where it is tested if the distribution follows a normal distribution having a mean value m and a standard deviation s. To this end, effective statistic techniques, such as skewness, kurtosis, Geary values, normal probability paper (Q-Qplot) or chi-square testing, are employed. If the distribution is recognized to follow the normal distribution (YES), control passes to step S54 and if otherwise, control passes to step S55.

That is, if the result at step S53 is YES, control passes to step S54 and, if the distribution is recognized not to belong to any class at step S54, that is if the result of step S55 is NO, control passes to step S55.

It is noted that testing at step S54 is carried out both for the sale volume itself and for the sale volume per unit of an arbitrary number of visitors, such as 1,000 visitors. If the distribution is recognized to be normal with respect to the former, it is called simply "normal" and, if it is recognized to be normal with respect to the later (for 100 visitors), it is called "normal 1000 type". The number of visitors of 1000 is adopted for convenience in unit number selection and any other number suffices in which case the sale volume is that for the unit of the adopted number of visitors. Any distribution rejected in the testing is again tested after discarding an extremely small number of abnormal values and, if the distribution is now accepted, it is recognized to be of the normal type.

Any distribution rejected at step S54 with respect to any of the normal type and normal 1000 type is tested as to the lognormal type. Thus a logarithm is taken of the sale volume, after discarding data with zero sale volume, and testing is carried out by employing the same techniques as those employed in the testing of the normal type, as to if the distribution of the value is of the normal type. The distribution accepted with the lognormal type testing is classified as being of the lognormal type. If the distribution is not accepted, it is tested as if the logarithm of the sale volume per 1000 visitors is of the normal type and the distribution accepted with the testing is classed as being of the lognormal 1000 type. It is noted that since the distribution rejected with the testing may still be accepted if an extremely small number of abnormal values are discarded, the distribution accepted in the latter case is also classified as being of the lognormal type.

With the distributions classed as being of the normal type at step S54, the mean value m and the standard deviation s are accepted as characteristic values of the distribution.

As to articles which are not classed as being of the normal type at step S54, that is articles which are not of the Poisson type or of the normal type, statistic analyses are made at step S55 as to the influence of causals, and a model of a regression formula is prepared. For processing at step S55, control first passes to step S56 (YES) and, if the distribution is found to not belong to any of the above-mentioned types (that is if the result of checking at step S55 is NO), control passes to step S57.

Among the causals, taken into account at step S56, there are a unit price, day of the week, month of the year, distribution of advertisements made by the newspapers, possible entertainments, weather, one-thirds of the month and temperature. It is tried in this case to explain the sale volume per 1000 visitors by causals. That is, each causal is tested as to its significance and a regression formula is formulated by the causals decided to be significant. It is noted that, since the causals include continuous variables, such as temperature, and categorical variables, such as weather or day of the week, the model of the regression formula also contains categorical variables. If the coefficients of determination of the regression formula are too small, the distribution is decided to be not the causal type. If the regression formula is formulated, model testing is carried out. A difference (residual) between the real value and the model value is found and testing is made of normality or independency of the residuals. In case of lack of normality, new causals are added or abnormal values discarded for formulating a new regression model. In establishing the model, any other efficient statistic testing techniques may be employed.

A so-called linear multiple regression formula and a logarithmic linear multiple formula are adopted as the above-mentioned regression formula.

With the linear regression formula, the sale amount per 1000 visitors is analyzed by regression analysis with the use of causals. Testing is made of normality or independency of the residuals of the estimated values by the model and the real values. If normality or independency are recognized to exist, but estimated values having the negative sign are produced frequently, the model is not adopted and the logarithmic multiple regression analysis is carried out.

With the logarithmic regression formula, the logarithmic value of the sale volume per 1000 visitors is analyzed by regression analysis with the use of causals. In the present analysis, zero data are discarded and only data having the positive sign are used. The residuals are tested as to the normality and independency and, if these are recognized, the model is accepted. An exponential value $e^z$ of an estimated value-by this model is the estimated value of the sale volume. Meanwhile, the above value is necessarily a positive value.

The distribution not classed as being of the causal type, that is the articles which are not of a Poisson type, normal type or a causal type, are classed under "other type" at step S57, and a frequency distribution is formulated of the sale amount of the article.

By classifying sale characteristics of the articles based on the POS data, the following favorable results are achieved.

First characterization by a small number of characteristic values is achieved. That is, characterization of the articles may be achieved by analyzing the features of the sale amount for each article and grasping the characteristic values.

The Poisson type articles are those articles sold most fortuitously and the mean value m is the sole characteristic value of these products. That is, if the mean value m is known, the probability of the sale amount of the article may be known from the following formula:

$$p(i) = \frac{\exp(-m)}{i!} m^{-1} \qquad (1)$$

The article of this type may be said to sell most stably without being influenced by causals. That is, such least time-consuming from the viewpoint of store management.

The above-mentioned normal type goods are those goods the sale amount of which is varied by fortuitous variations around the mean value m. It is a standard deviation s which indicates the extent of these variances. If the amount of sale shows a normal distribution having a mean value m and a standard deviation s, a probability function f(x) having a sale amount x is given by the formula 2:

$$f(x) = \frac{1}{\sqrt{2\pi} \; s} \exp\left(-\frac{(x-m)^2}{2S^2}\right) \qquad (2)$$

If the distribution of a sale amount is of a normal type, a mean sale amount may be known from the mean value m, while variances from the mean value may be known from the standard deviation s. The sale characteristics of the normal type goods may be determined from these two parameters.

If the distribution of a sale amount is of a lognormal type, $\log(x)$ shows a distribution of the type of the formula (2), based on which similar analyses may be made. As for the normal 1000 type, distribution of an actual sale amount may be estimated by estimating the number of customers visiting a store using a method for estimating the number of customers visiting a store as proposed by the specification and the drawings of the JP Patent Application No. H-2-100278 filed in the name of the present Applicant.

If the distribution of a sale amount is of a causal type, the amount of sale y per 1000 guests may be expressed by formula (3), based on significant factors $I_i$, in the case of a linear multiple regression model:

$$y = c_0 + c_1 I_1 + \ldots \ldots + c_k I_k + \epsilon \qquad (3)$$

In the above formula 3, $c_0$ is a constant term and $c_i$ is a coefficient indicating the degree of effect of a causal (factor) i. $\epsilon$ is an error term showing a normal distribution having a mean value 0 and a standard deviation s in the case of an efficacious model. These values $c_0, c_1, \ldots, c_k$, s are obtained as a result of analyses of a regression formula.

In the case of a logarithmic linear multiple regression formula, a model formula is given by $$\log(y) = c_0 + c_1 I_1 + \ldots \ldots + c_k I_k + \epsilon \qquad (4)$$

Figure 3:
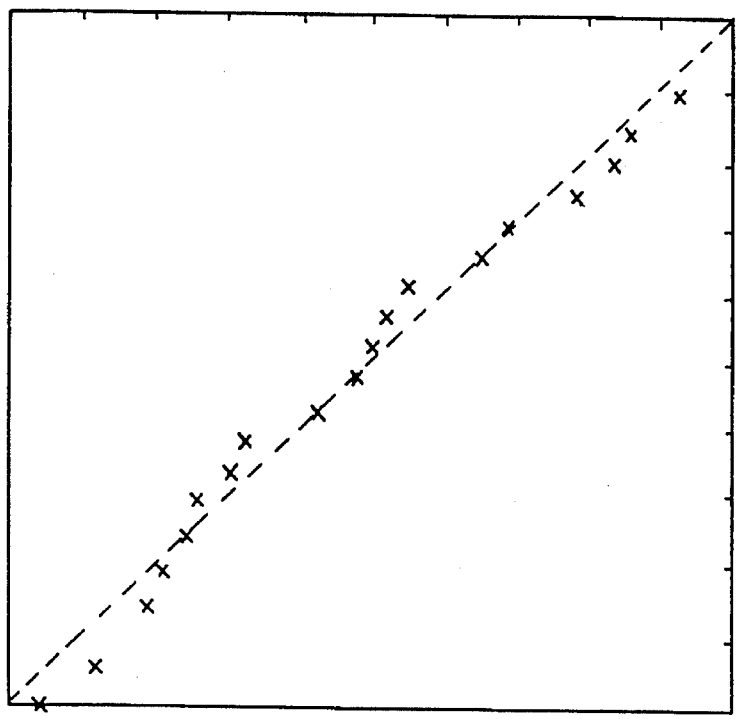
FIG. 3 shows data of an example of normal type data plotted on a Gaussian probability paper.

In this formula (4), the meanings of numerical values $c_0, c_1, \ldots, c_k$, s are the same as those in FIG. 3. That is, characteristics of this type of distribution are determined by (k+1) number of parameters $c_0, c_i, \ldots c_k$ and the standard deviation s.

If the distribution of the sale amount of an article is of other types, the probability p(i) having the sale amount i is calculated from data and data sets (i, p(i)) are arranged in the form of a table. The mean value m and the standard deviation s of the sale amount of the article are calculated. Meanwhile, if the distribution of the article is determined to be of the other type, it may still be recognized to be of the causal type, by renewed testing subject to addition of new causals.

In sum, the Poisson type goods and the normal type goods may be termed stable type goods, meaning that the sale of these goods are stable within the range of fortuitous fluctuations. On the other hand, the causal type goods may be termed variable type goods because of larger variations due to causals. The articles of the other type may also be termed the variable type goods.

The fact that the goods may be roughly classified into the stable type goods and the variable type goods means a significant managerial asset because the related knowledge may be effectively utilized for strategies such as laying-in of commodities, inventory control or advertisements.

As estimation of the sale amount, estimation of the sale amount may be made in the following manner as a function of the types of the goods.

If an article is of the Poisson type, the probability p(i) of the sale amount being i may be known by the above formula 1. For example, for m=2, the probability p(i) is as shown in the following Table 1.

TABLE 1

| sale volume i | probability p(i) | accumulative probability p(i) |
|---|---|---|
| 0 | 0.1353 | 0.1353 |
| 1 | 0.2707 | 0.4060 |
| 2 | 0.2707 | 0.6767 |
| 3 | 0.1804 | 0.8571 |
| 4 | 0.0902 | 0.9473 |
| 5 | 0.0361 | 0.9834 |
| 6 | 0.0120 | 0.9955 |
| 7 | 0.0034 | 0.9989 |

It is seen from this Table 1 that days with the sale amount of zero account for nearly 14%, whereas days with sale amount of not more than four account for 95%.

If an article is of a normal type, the probability of an article having a mean value m and a standard deviation s selling in an amount of from a to b, where a<b, is given by the formula 5:

$$p = \int_a^b \frac{1}{\sqrt{2\pi} \; s} \exp\left(-\frac{(t-m)^2}{2S^2}\right) dt \qquad (5)$$

The probability of the sale amount being 8 to 12 for m=10 and s=2 is found to be p=0.308, by substituting a=8 and b=12 in formula 5 for calculation. In the case of a logarithmic probability distribution, the probability of a sale amount may similarly be grasped by the similar calculation.

If the goods are of the causal type, the sale amount or its logarithmic value per 1000 guests may be grasped by substituting the values of the causals in the formulas 3 or 4. The sale amount of the goods of this type may also be estimated by estimating the number of guests by the method for estimating the number of guests according to the specification and the drawings of the above-mentioned JP Patent Application No. 2-100278 proposed by the present Applicant.

If the goods are of the other type, sale amount range may be known by Chebychev's formula based on the mean value m and the standard deviation s. It may be shown in this manner that not less than $1 - 1/k^2$ times the sum total of the frequencies are comprised within a range of k times the standard deviation s from the mean value m, that is within the range of m−ks to m+ks.

On the other hand, proper inventory control is crucial for store management. That is, if the stock amount is too small, the chance of lost sale is incurred, whereas, if the stock amount is excessive, inventory expenses are incurred. The inventory policy for procuring safe stock of 100% is explained with various types of the goods. Meanwhile, p is a number between 0 and 1 so that, if p=0.95, demand of 95% of the guests can be coped with.

If the goods are of the Poisson type, the stock amount i for assuring the safe inventory of 100% is found from formula 1 to be the least value of I satisfying the formula 6.

$$\sum_{i=0}^{I} p(i) \geq p \qquad (6)$$

This has tremendous merits because it leads directly to automation of ordering of the Poisson type goods. With the above-mentioned example of the mean value m=2, the safe stock rate of approximately 95% is achieved with the stock amount of four.

If the goods are of the normal type, the number of safe stock amount may be calculated from the above formula 3. That is, if the safe stock rate is 100%, the safe stock amount assuring the safe stock ratio is a value of x satisfying the formula 7.

$$\int_{-\infty}^{x} \frac{1}{\sqrt{2\pi} \, S} \exp\left(-\frac{(t-m)^2}{2S^2}\right) dt = p \qquad (7)$$

If the goods are of the causal type, the amount of safe stock may be calculated from the value of the error term ε. That is, since the error term is thought of as showing a normal distribution having a mean value of 0 and a standard deviation s, an excess amount of safe stock x assuring a safe stock rate of 100% per 1000 guests is a value of x satisfying the formula 8.

$$\int_{-\infty}^{x} \frac{1}{\sqrt{2\pi} \, S} \exp\left(-\frac{t^2}{2S^2}\right) dt = p \qquad (8)$$

The sum of the value of x and the estimated sale amount obtained by substituting an estimated value in causals represents a stock amount for safe stock ratio of 100%. An actual safe stock amount may be known by multiplying an estimated value of the number of guests by this value.

If the goods are of the other type, the safe stock amount I may be known from the table of probability distribution as the least value of I satisfying the formula 9:

$$\sum_{i=0}^{I} p(i) = p \qquad (9)$$

As examples of the sale amount data, data for the above-mentioned Poisson type, normal type or the causal type are given herein below.

First sale amount data of yogurt A for 82 days are shown in the following Table 2 as an example of Poisson type goods.

TABLE 2

Sale amount of Yogurt A for 82 Days

| 0 | 2 | 1 | 1 | 0 | 2 | 1 | 1 | 1 | 0 | 3 | 0 | 2 | 2 | 0 |
|---|---|---|---|---|---|---|---|---|---|---|---|---|---|---|
| 1 | 2 | 4 | 2 | 0 | 2 | 2 | 0 | 3 | 1 | 1 | 0 | 1 | 1 | 1 |
| 3 | 2 | 5 | 4 | 0 | 2 | 0 | 1 | 3 | 1 | 2 | 1 | 3 | 0 | 2 |
| 4 | 0 | 1 | 1 | 0 | 1 | 2 | 0 | 2 | 4 | 2 | 0 | 4 | 1 | 1 |
| 1 | 2 | 0 | 1 | 0 | 1 | 1 | 3 | 1 | 1 | 1 | 2 | 3 | 1 | 1 |
| 1 | 1 | 1 | 1 | 1 | 3 | 1 |   |   |   |   |   |   |   |   |

In the above Table, a mean value=1.4268, a standard deviation of 1.1690 and a variance=1.3666 are found as statistic values. Thus the sale amounts i, frequencies $f_i$ and Poisson's theoretical values $g_i$ are as shown in the following Table 3.

TABLE 3

| sale volume i | frequency $f_i$ | Poisson theoretical value p(i) |
|---|---|---|
| 0 | 17 | 19.686 |
| 1 | 34 | 28.088 |
| 2 | 17 | 20.038 |
| 3 | 8 | 9.530 |
| 4 or over | 6 | 4.657 |

The chi-square values of the data shown in Table 3 may be found from the formula 10:

$$\sum_{i=0}^{4} \frac{(f_i - g_i)^2}{g_i} = 2.70 \qquad (10)$$

Besides, the chi-square value for 3 degrees of freedom and the level of significance of 5% is 7.81, while 2.70<7.81, so that the hypothesis that the data of Table 3 are specimens from the Poisson distribution cannot be rejected with the level of significance of 5%. For this reason, the yogurt A is determined to be of the Poisson type and a mean value of 1.4268 is accepted as a characteristic value of the goods.

The sale amount data of milk B, as an example of the normal type goods, for 91 days, are shown in the following Table 4.

TABLE 4

Sale Amount of Milk B for 91 Days

| 25 | 23 | 21 | 16 | 24 | 20 | 22 | 20 | 26 | 20 |
|---|---|---|---|---|---|---|---|---|---|
| 18 | 20 | 18 | 15 | 33 | 21 | 18 | 22 | 25 | 14 |
| 28 | 20 | 29 | 24 | 20 | 21 | 25 | 18 | 18 | 32 |
| 22 | 19 | 19 | 20 | 21 | 19 | 25 | 18 | 18 | 32 |
| 18 | 21 | 27 | 24 | 20 | 20 | 20 | 20 | 24 | 27 |
| 27 | 20 | 20 | 24 | 21 | 20 | 25 | 29 | 25 | 24 |
| 20 | 20 | 25 | 19 | 25 | 30 | 18 | 27 | 25 | 23 |
| 17 | 25 | 24 | 17 | 17 | 19 | 18 | 23 | 25 | 23 |
| 24 | 23 | 25 | 20 | 20 | 25 | 25 | 22 | 12 | 24 |
| 26 |    |    |    |    |    |    |    |    |    |

From Table 4, the mean value=21.912, standard deviation =3.889, the skewness=0.285 (significant with 5% level), kurtosis=3.107 (or 3 in case of normal distribution) and Geary value=0.818 (significant with 10% level) are found as statistic values. That is, the plot of the data shown in Table 4 on a normal probability paper is as shown in FIG. 3. From this figure, the mean value is determined to be 21.912, while the standard deviation is determined to be 3.889. The 95% safe stock amount of the goods is m+1.645s=28.

The sale amount data of a beverage C, as lognormal type goods, for 90 days, are shown in table 5.

TABLE 5

Sale Amount of Beverage C for 90 Days

| 23 | 32 | 22 | 16 | 12 | 16 | 8 | 23 | 36 | 7 |
|---|---|---|---|---|---|---|---|---|---|
| 11 | 14 | 17 | 10 | 19 | 18 | 20 | 19 | 14 | 9 |
| 15 | 15 | 21 | 13 | 29 | 41 | 59 | 70 | 45 | 32 |
| 27 | 23 | 24 | 23 | 21 | 23 | 15 | 13 | 18 | 21 |
| 18 | 12 | 25 | 18 | 11 | 16 | 14 | 11 | 15 | 30 |
| 40 | 7 | 10 | 9 | 7 | 12 | 18 | 12 | 13 | 7 |
| 14 | 13 | 19 | 34 | 30 | 17 | 15 | 13 | 14 | 7 |
| 13 | 20 | 21 | 22 | 12 | 24 | 14 | 22 | 14 | 15 |
| 19 | 10 | 21 | 44 | 16 | 26 | 5 | 7 | 15 | 3 |

From Table 5, the mean value=19.0889, standard deviation= 10.9632, the skewness=1.9922 (insignificant with 1% level), kurtosis=8.5217 (or 3 in case of normal distribution) and Geary value=0.6974 (insignificant with 1% level) are found as statistic values. Therefore, these data are not accepted with normality tests.

Figure 4:
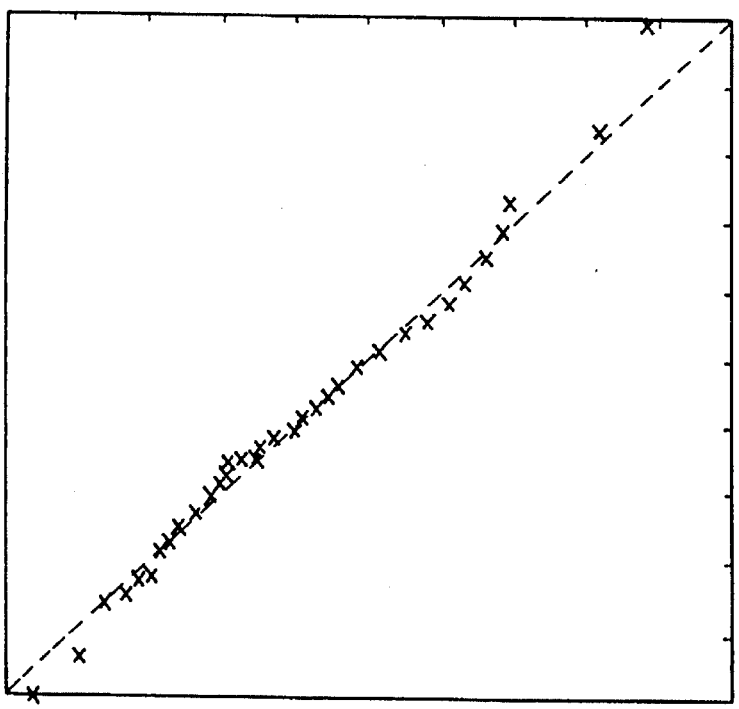
FIG. 4 shows data of an example of a lognormal type data plotted on a normal probability paper.

Then a lognormal test is conducted and the mean value= 2.81126, standard deviation=0.525643, the skewness=−0.109866 (significant with 5% level ), kurtosis=3.86336 (or 3 in case of normal distribution) and Geary value=0.776758 (significant with 5% level) are found as statistic values concerning the values of the logarithms taken of the data of Table 5. That is, the plot of the data shown in Table 5 on a normal probability paper is as shown in FIG. 4. Therefore, these data are determined to be of the lognormal type.

From the following formula 11, the safe stock amount of the goods (beverage C) at the safe stock ratio of 95% is found to be 40:

$$e^{m+1.645s} = e^{2.81126+1.645 \times 0.525643} = 40 \qquad (11)$$

On the other hand, with the causal type goods, typical of the causals are day of the week, weather, whether advertisements have been made, temperature, prices, etc. These causals are classified into continuous causals, such as temperature or units prices, and categorical causals, such as days of the week, that is, Sunday, Monday, etc. or weather, such as rainy, cloudy or fine weather. Based on these causals, models for explaining the amounts of sale of articles per 1000 guests by multiple regression formulas including categorical variables are formulated.

These models may be roughly classified into a model in which the amount of sale y per 1000 guests is directly multiple regressed by linear regression analysis by causals, and a model in which a logarithm of the amount of sale y (log (y)) per 1000 guests is regressed by causals by loglinear regression analysis which of these is to be adopted is determined by taking account of the values of decision coefficients, normality of the errors and application etc.

For the above-mentioned regression model, coefficients of the significant causals in a model shown by formula 12

$$y = c_0 + c_1 I_1 + \ldots + c I_k + \epsilon \qquad (12)$$

as the above-mentioned multiple regression model are found by multiple regression analysis. The decision coefficients are found in this formula 12 and normality of the errors is also checked to check for validity as model.

As an example of the multiple regression model, the sale amount of yogurt D for 88 days is shown in Table 6. Meanwhile, the data of Table 6 represent the amount of sale per 1000 guests.

TABLE 6

| Sale Amount of Yogurt D per 1000 Guests for 88 Days | | | | | | | |
|---|---|---|---|---|---|---|---|
| 2.11 | 3.85 | 1.45 | 1.44 | 3.01 | 1.34 | 2.02 | 3.88 |
| 4.31 | 0.89 | 2.97 | 1.25 | 0.30 | 0.32 | 1.80 | 2.53 |
| 1.52 | 0.52 | 0.89 | 1.87 | 3.43 | 2.43 | 0.90 | 0.94 |

TABLE 6-continued

| Sale Amount of Yogurt D per 1000 Guests for 88 Days | | | | | | | |
|---|---|---|---|---|---|---|---|
| 2.68 | 2.12 | 1.24 | 1.15 | 1.81 | 0.86 | 1.77 | 1.43 |
| 1.82 | 2.27 | 18.81 | 13.94 | 20.19 | 15.15 | 1.79 | 1.74 |
| 4.29 | 2.15 | 2.47 | 2.55 | 2.45 | 3.57 | 1.22 | 3.67 |
| 0.27 | 1.80 | 1.65 | 1.03 | 0.29 | 0.90 | 0.80 | 1.92 |
| 1.46 | 1.43 | 0.73 | 2.55 | 0.75 | 0.35 | 13.60 | 16.09 |
| 21.81 | 19.95 | 23.62 | 20.45 | 15.70 | 17.15 | 1.48 | 1.75 |
| 0.95 | 1.41 | 2.01 | 2.60 | 1.49 | 1.72 | 10.03 | 13.58 |
| 16.38 | 12.63 | 15.79 | 18.90 | 17.45 | 10.54 | 13.25 | 6.88 |

These data were analyzed by regression analysis using, as candidates of causals, the days of the week (classed into week days, Saturday and Sunday), whether advertisements were made (four categories of advertisements, no advertisements, end, mannequin), days before or after store holidays (three categories of before the store holiday, after the store holiday and other days), weather (three categories of rainy weather, cloudy weather and fine weather), maximum temperature (continuous variables expressed in degrees Centigrade) and unit prices (continuous variables of yen). It was found that the weather and unit price represent significant causals. The regression formula is as shown in the following formula 13.

$$\begin{aligned} y = {} & 50.787 & \text{(constant term)} \\ & 0 & \text{(rainy)} \\ & + 2.438 & \text{(cloudy)} \\ & 0.768 & \text{(fine)} \\ & - 0.203 & \times \text{unit price} \end{aligned} \qquad \ldots (13)$$

The decision coefficient is 0.82. The residuals (=actual values−model values) after fitting the formula 13 are shown in the following Table 7:

TABLE 7

| Residuals | | | | | | | |
|---|---|---|---|---|---|---|---|
| −0.86 | 0.87 | 0.14 | 1.70 | 0.03 | 0.71 | 2.58 | 3.01 |
| −0.41 | 0.14 | −4.66 | 0.71 | −0.24 | −0.99 | 0.50 | 1.23 |
| −1.46 | −2.46 | −2.09 | 0.56 | 0.46 | −0.55 | −0.41 | −2.04 |
| 1.38 | −3.84 | −0.06 | −0.16 | −2.98 | −2.11 | 0.46 | 0.89 |
| −1.16 | −0.71 | 3.32 | −0.78 | 5.47 | −2.01 | −1.19 | −1.23 |
| 1.32 | −0.83 | 1.16 | 1.25 | 1.23 | 2.27 | −0.09 | 3.13 |
| −1.03 | 0.49 | 0.35 | −0.27 | −1.01 | 0.36 | −0.51 | 0.61 |
| −1.52 | −1.54 | 0.19 | −0.42 | −0.56 | 2.04 | −1.12 | 0.60 |
| 4.65 | 5.23 | 6.46 | 3.29 | 0.29 | 0.00 | 0.94 | 1.22 |
| −0.36 | 0.87 | 0.71 | 1.30 | 0.18 | 1.19 | −3.43 | −1.91 |
| −0.78 | −4.53 | 1.07 | 3.41 | 1.96 | −4.95 | −1.47 | −0.75 |

As a result of testing for normality of the residuals of Table 7, the skewness=0.2986 (significant with 5% level), kurtosis=4.1785 (presenting a skirt of a gentler curve than the normal distribution), the geary=0.7281 (significant with about 1%) and the Durbin-watson ratio=1.5559 (with small serial correlation; the residuals are recognized to be independent) were found. Although not shown, the plot on the normal probability paper also indicated that the data were of the normal type.

As an example of the lognormal regression model, a regression model was formulated for explaining the logarithm of the sale amount y (log (y)) by the same candidates of causals as above, using the same data as those shown in table 6. As a result, a model shown by formula 14 could be obtained (decision coefficient=0.72).

$$\begin{aligned}
\log(y) = \phantom{+}&8.244 & &\text{(constant term)} \\
&0 & &\text{(rainy)} \\
+\,&0.359 & &\text{(cloudy)} & \ldots (14)\\
&0.134 & &\text{(fine)} \\
-\,&0.032 \times & &\text{unit price}
\end{aligned}$$

The decision coefficient is 0.72. As a result of calculation of the residuals with this model and testing for normality of these residuals, the skewness=−0.9614 (significant with 5% level), kurtosis=4.3095 (presenting a skirt of a gentler curve than the normal distribution), the Geary=0.7339 (significant with about 1%) and the Durbin-watson ratio=1.7403 (with small serial correlation; the residuals are recognized to be independent) were found. Although not shown, the plot on the normal probability paper also indicated that the residuals were substantially of the normal type.

It may also occur that the two models are both significant, as in the above example. These two models are used for objects proper to them. With the former model, the respective significant causals operate independently. In the case of continuous variables, their effects and intensities are indicated by coefficients, the values of which are constant irrespective of the values of the variables. With the latter model, the relative rate of change of the sale amount (dy/y), which is an explanatory variable, may be expressed by a linear equation of each of the significant causals. The coefficients indicate cost resiliency. With the above example, cost resiliency is 0.032 (3.2%). Similarly, if the temperature is significant, temperature resiliency may also be measured. The latter model is more suitable for checking such resiliency.

Meanwhile, the above-described classifying operation needs to be updated at all times based on accumulated daily POS data because the classes and characteristics of the goods are usually changed with lapse of time. For this reason, it is necessary to provide a system for taking new POS data and automatically carrying out a classifying operation. Meanwhile, such system may be operated independently in each store or by a host computer installed at a main office.

Figure 5:
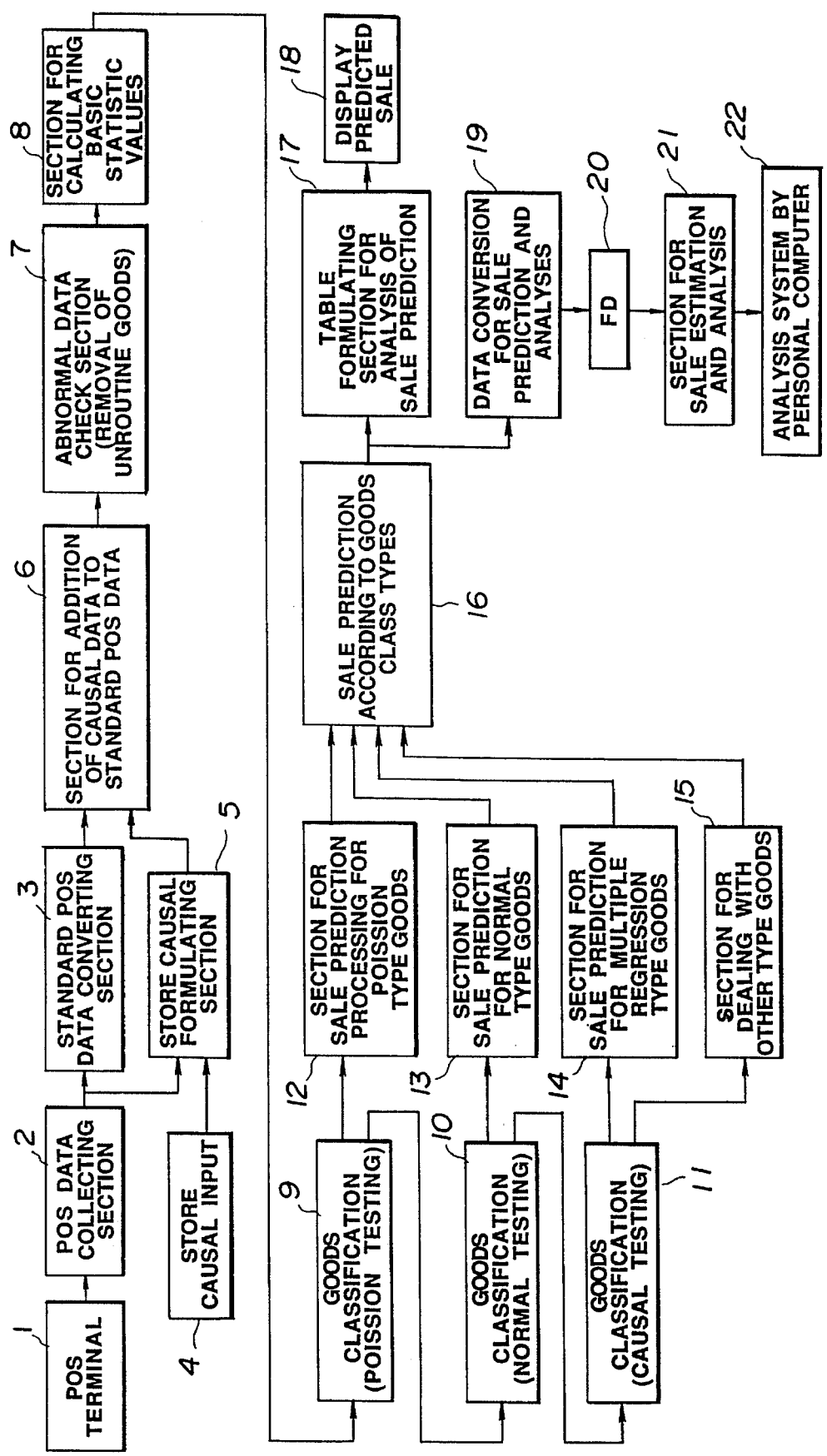
FIG. 5 is a block diagram showing a schematic construction of a classifying system for sale amount characteristics embodying the present invention.

FIG. 5 shows, in a block diagram, a system for classifying sale quantity characteristics of the present embodiment.

In the system shown in FIG. 5, the POS data are supplied from a POS terminal 1 as POS of data entry means. These POS data are supplied to a POS data collecting section 2 of data arranging means comprising a standard POS data converting section 3, an entry section 4, a store causal formulating section 5, an addition section 6 and the POS data collecting section.

The POS data collecting section 2 sorts the supplied data into POS data and store causal data, such as the number of visitors or the number of operating days proper to each store. The above POS data are transmitted to the standard POS data converting section 3, while the store causal data are supplied to the store causal formulating section 5.

The POS data converting section 3 converts the POS data into standard POS data classified according to both the articles and time zones and according to the articles and days. The store causal formulating section 5 is also supplied with store causal data, such as weather or temperature, from the entry section 4. The store causal formulating section 5 formulates store causal data based on the number of the visitors, number of days of operation, weather, temperature, etc.

Data from the store causal formulating section 5 and the standard POS data converting section 3 are both supplied to the addition section 6. The addition section 6 adds the store causal data to the standard POS data classified according to both the articles and time zones and according to the articles and days. Data from the addition section 6 are supplied to an abnormal data checking section 7.

The abnormal data checking section 7 discards the non-routine goods at step S3 shown in FIG. 1. The discarding operation is performed of the standard POS data classified according to both the articles and time zones and according to he articles and days. An output of the abnormal data checking section 7 is supplied to a basic statistic value calculating section 8 as basic statistic value calculating means.

In the basic statistic value calculating section 8, the statistic calculations of step S4 of FIG. 1 made on the above-mentioned standard POS data classified according to both the articles and time zones and according to the articles and days. An output of the calculating section 8 is supplied to the downstream side circuitry of the classifying means. First, the output is supplied to an article classification section 9 for Poisson testing as indicated at step S51 of FIG. 2. Data determined to be of the Poisson type goods at the classification section 9 are supplied to a prediction processing section 12 for estimation processing of Poisson type goods. Data not determined to be of the Poisson type are supplied to an article classification section 10 for normality testing as indicated at step S53 of FIG. 2. In the article classification section 10, normality testing is conducted on the above-mentioned standard POS data classified according to both the articles and time zones and according to the articles and days. Data determined to be of the normal type goods at the article classification section 10, that is data of the normal type goods, normal 1000 type goods, lognormal type goods and lognormal 1000 type goods, are transmitted to a prediction processing section for normal type goods 13. Data not determined to be of normal type goods are transmitted to a goods classification section 11 for causal detection as indicated at step S55 of FIG. 2. In the goods classification section 11, causal testing is conducted on the above-mentioned standard POS data classified according to both the articles and time zones and according to the articles and days. Data determined to be of the causal type goods, that is data of the multiple regression type goods or the logarithmic multiple regression type goods, are transmitted to a prediction processing section for prediction processing of multiple regression type goods 14 for multiple regression as indicated at step S56 of FIG. 2, while data determined not to be of the causal type goods are transmitted to the other type goods accommodating prediction processing section 15, where processing is carried out on the above-mentioned standard POS data classified according to both the articles and time zones and according to the articles and days.

Predicted Poisson type sale data from the prediction processing section 12 for prediction processing of Poisson type goods, predicted normal type sale data from the sale prediction processing section for normal type goods 13, predicted multiple regression type sale data from the sale prediction processing section for prediction processing of multiple regression type goods 14 and other type goods accommodating data from the other type goods accommodating processing section 15, are transmitted to a sale prediction formulating section for predicting the according to types of the goods classes 16. Predicted sale data according to the class types of the goods are outputted at the sale prediction formulating section for estimating the sale according to types of the goods classes 16.

These predicted sale data are transmitted to a table formulating section for formulating a table for analyses of sale prediction 17 and to a data converting section for converting data for analyses of sale prediction 19. Data from the table formulating section 17 are transmitted to a display section 18 for display.

Data from the data converting section for converting data for analyses of sale prediction 19 are recorded on, for example, a recording medium, such as a floppy disc (FD) 20. An analytic system by another personal computer having a sale prediction analysis section 21 may be operated using this floppy disc.

An method for ordering for restocking based on sale characteristics of goods is hereinafter explained.

This replenishing ordering system is a method for deciding an optimum safety stock by simulation in a system for ordering for restocking based on the classified data from the above-mentioned system for classifying the sate amount characteristics. This method for ordering for restocking is important for controlling the stock level of daily delivered goods, such as foodstuff, for which importance is placed on freshness, to a reasonable level.

As a basic inventory control in the method for ordering for restocking, a case in which the time since ordering until delivery of goods is short, for example, the lead time until delivery is overnight so that an order is placed at night and goods are delivered next morning, and a case in which the lead time is long, that is the lead time is longer than one day, are to be studied separately.

It is assumed that the residual amount at the close of the store hours is Z and, of these Z goods, D goods are to be scrapped because of expiration of the available period. The quantity U of the goods to be carried over to the next day is expressed by $$U = Z - D \tag{15}$$

If the estimated sale for tomorrow is Y, the amount of the restocking order for today is obtained by $$P = \max\{Y - U + \alpha, 0\} \tag{16}$$

In the above formula, the variable $\alpha$ indicates a safety stock for preventing chance loss due to failure in sale caused by shortage of the goods. Therefore, if the value of the safety stock $\alpha$ is small, chance losses are increased, whereas, if the safety stock $\alpha$ is larger, the stock quantity and hence the quantity of scrapped goods are increased. The method for finding an optimum value of the safety stock $\alpha$ is explained subsequently. If there is a minimum unit in the ordered quantity of the goods, the quantity of the restocking order is rounded up to a quantity corresponding to the minimum unit. The variables required in the present restocking ordering system are an estimated sale for tomorrow Y and a safety stock $\alpha$.

The estimated sale for tomorrow Y is decided based on the above-mentioned classification of the sale quantity of the goods. Referring briefly to the classification of the sale quantity of the goods, sale of the goods classified under the causal type is predicted by the regression formula. Consequently, causal data for tomorrow are substituted into the regression formula for estimating the estimated sale Y. With the goods classified under the normal type, the mean value of the normal distribution is the predicted sale for tomorrow Y. However, if the standard deviation is larger, a regression formula by causals is formulated and, if the variation is decreased significantly, the goods are classed as being of the causal type and processed accordingly. For goods not classed under the Poisson type or under any of the above class types, the mean value is adopted as the estimated sale for tomorrow Y.

The method for calculating the safety stock $\alpha$ is explained.

For calculating the safety stock m, a number of safety stocks m are assumed and the optimum safety stock m is decided from the results of inventory simulation carried out using past data. Since the safety stock $\alpha$ is correlated with the variance of the sold quantity, a measure of the safety stock $\alpha$ is correlated with the variance of the past sale amount.

For causal type goods, the standard deviation of the residuals of the estimation formula, or standard error, is used as a concrete method for such correlation. In case of a larger variance of the sale amounts, the sale amounts are divided into several domains according to the size of the sales and the standard deviation of the residuals or the standard error belonging to each domain is employed. In this case, the standard deviation or the standard error tends to be changed in proportion to the sale amounts.

For the causal type goods, the standard deviation or the standard error of the sale amounts is set to $\sigma$. A number of safely stock quantities a are expressed by values equal to 0.5 times the values of the standard deviation or standard error $\sigma$ of the sale amounts, that is, by $$\alpha = 0.05\sigma, \sigma, 1.5\sigma, 2.0\sigma, 2.5\sigma \tag{17}$$

and, using these plural safety stocks $\alpha$, sale simulation as later described is carried out on data of past t days, using these plural safety stocks $\alpha$.

For Poisson type or normal type goods, the standard deviation or the standard error of the sale amounts is employed. For other type goods, the standard deviation or standard error of the sale amounts is used as a measure of the safety stock.

For sale simulation for the causal type goods, the sale amounts for the latest t days are set to $y_1, y_2, \ldots y_t$, while the estimated sale amounts for tomorrow by the estimation formula are set to $Y_1, Y_2, \ldots Y_t$.

Figure 6:
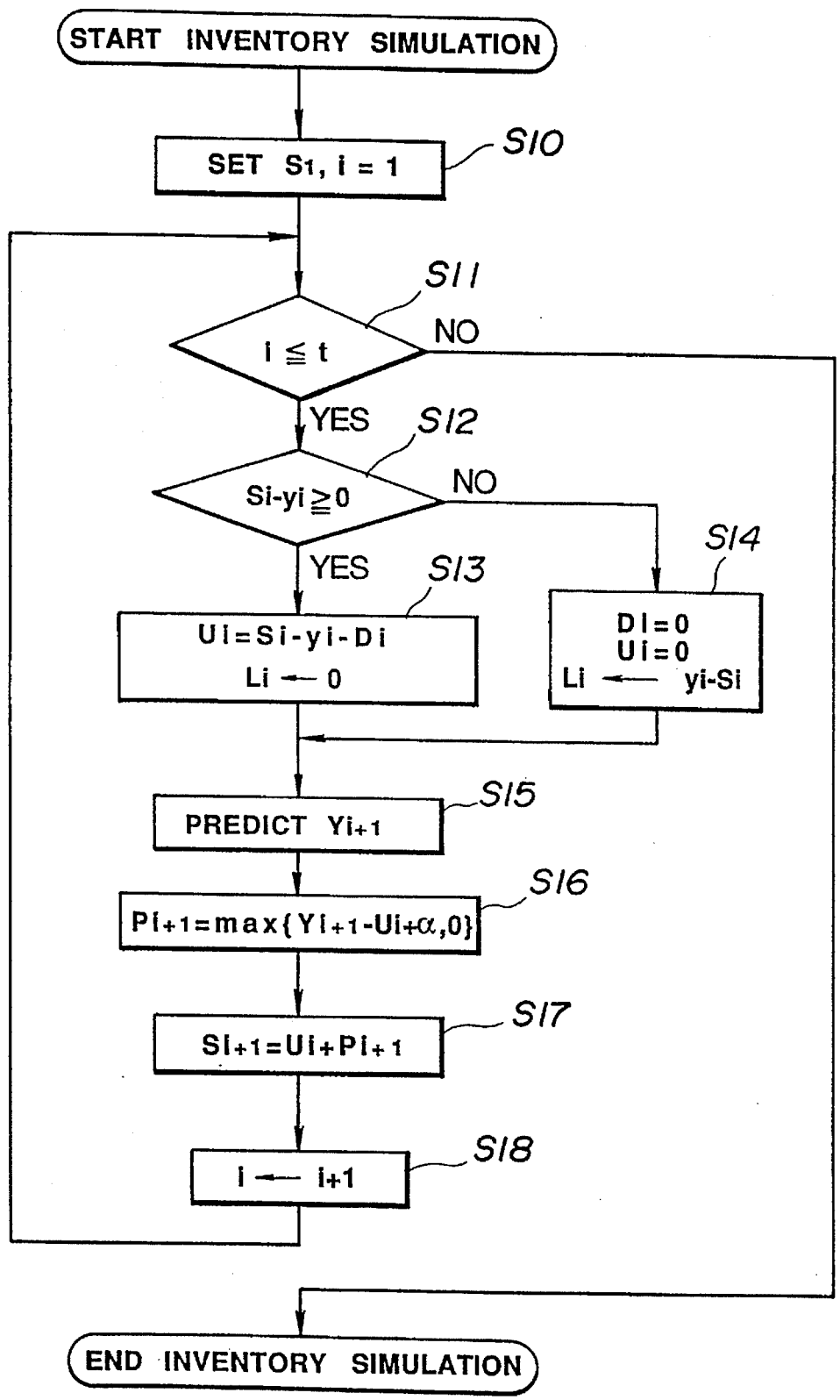
FIG. 6 is a flow chart showing a sequence of simulating operations in a system for ordering for restocking.

The sequence of the simulation for finding an optimum safety stock $\alpha$ of the causal type goods is explained by referring to a flow chart of FIG. 6.

Sale simulation is started for each of the safety stock amounts $\alpha$. First, an initial stock $S_1$ is set at step S10 as a first step of the sale simulation. The value of a variable i is set to 1 (i=1). The variable t used as past data for the simulation is also set before proceeding to step S11 ff by way of carrying out a second stage of operations. In the second stage of the operations, the daily stock, scrap and lost sale since an ith day until the tth day are calculated repeatedly.

At step S11, it is checked whether or not the value of the variable i is not less than the value of the variable t. If the value of the variable i does not reach the value of the variable t, control passes to step S12 to continue the simulation. If the value of the variable i exceeds the value of the variable t, this inventory stimulation is terminated.

At step S12, if the stock $S_i$ for the ith day is not less than the sale $y_i$ for the ith day. ($S_i - y_i \geq 0$), control passes to step S13. If the stock $S_i$ for the ith day is less than the sale $y_i$ for the ith day, that is if the supply is in shortage with respect to the demand ($S_i - y_i < 0$) such that loss of sale has occurred, control passes to step S14.

At step S13, the amount of goods among the residual goods ($S_i - y_i$) for which the available period has elapsed is a scrapped amount $D_i$ for the ith day. With the scrapped amount $D_i$ thus set, the amount $U_i$ carried over to the next day at the ith day is obtained from $$U_i = S_i - y_i - D_i \tag{18}$$

In this case, it is assumed that the lost sale $L_i$ for the ith day is set to zero so that zero is substituted in the lost sale $L_i$. Control then passes to step S15.

The state of step S14 is that in which the quantity of demand exceeds the quantity of supply. In this state, all the goods have been sold and lost sale has occurred. The parameters of the scrapped quantity $D_i$ and the carry over $U_i$ for the ith day are both zero and the lost sale $L_i$ is shown by $y_i - S_i$ where the sale amount $L_i$ and the stock $S_i$ stand for the quantity of demand by the guests and the supply quantity of the goods, respectively. After calculating these parameters, control proceeds to step S15.

At step S15, the estimated sale amount for the next day, that is the (i+1)th day, according to the class of the goods, is calculated and set. Control then passes to step S16.

At step S16, the quantity of the restocking order $P_{i+1}$ for the (i+1)th day is calculated by the formula $$P_{i+1} = \max\{Y_{i+1} - U_i + \alpha, 0\} \qquad (19)$$

from the amount of the estimated sale $Y_{i+1}$, carry-over $U_i$ and the safety stock $\alpha$ before control passes to step S17.

At step S17, the stock $S_{i+1}$ after delivery at the next day is found by summing the carry-over $U_i$ to the amount of restocking order at the (i+1)th day, that is by $$S_{i+1} = U_i + P_{i+1} \qquad (20)$$

At step S18, the value of the variable i is incremented by one. Control then passes to stp S11. If, at this step S11, the value of the variable i exceeds the value of t as mentioned previously, the inventory simulation is terminated. In carrying out the inventory simulation, attention should be directed to the trend of consumption because the consumers generally tend to prefer goods bearing a latest date stamp.

By this inventory simulation, the parameters of the stock amount $\{S_i\}$, the scrapped amount $\{D_i\}$ and the amount of lost sale $\{L_i\}$ for the ith day since the ith day until the tth day.

If the stock amount $\{S_i\}$ multiplied by stock costs $\tau_1$, the scraped amount $\{D_i\}$ multiplied by scrap loss per article $\tau_2$ and the amount of lost sale $\{L_i\}$ multiplied by chance loss per article $\tau_3$ are summed from the ith day until the tth day of the inventory simulation, the total stock costs $T(\alpha)$ $$T(\alpha) = \tau_1 \sum_{i=1}^{t} S_i + \tau_2 \sum_{i=1}^{t} D_i + \tau_3 \sum_{i=1}^{t} L_i \qquad (21)$$

is found. The total stock costs (m) shown in formula 20 is expressed as a function of the safety stock amount $\alpha$. The safety stock amount which minimizes the total stock costs ($\alpha$) is the optimum safety stock quantity a which is to be found. In this manner, the optimum safety stock amount $\alpha$ is decided in accordance with the restocking ordering method. However, if the supply is short, the number $y_i$ actually is not indicative of the real demand for the ith day, so that a larger weight needs to be applied to the chance loss in evaluating the results of the inventory stimulation.

The inventory simulation for goods classified under types of goods other then the causal type is hereinafter explained.

For normal type goods, the safety stock amount $\alpha$ is found in relation with the standard deviation or the standard error of the amounts of sale as in the above formula 17. The estimated sale amount Y is found from the mean value. A simulation similar to that described above may be carried out using these parameters. Above all, with lognormal type goods, the estimated sale amount may be indicated along with the safety stock amount $\alpha$ by $\exp(m+\alpha)$.

For Poisson type goods, the mean value is used as a sole parameter. This mean value may be used as the demand corresponding to several stock amounts and cumulative percent points of 50, 75, 90 and 95% are found from formula of the Poisson's distribution concerning the mean value. The simulation process is otherwise the same as the simulation process described above.

For the other type goods, the mean value and the standard deviation are used, or the standard error $\sigma$ is used for the same simulation process as that of normal type goods.

By ordering for restocking based on the safety stock amount, $\alpha$ minimizing the total stock quantity $T(\alpha)$ for a short time by the above-described inventory simulation, it becomes possible for an amateur without the knowledge about statistic methods to calculate the amount of restocking order minimizing both the scrapped amount and the chance losses subject to procurement of the related information.

The sequence of the simulation for the case in which the lead time for delivery for individual goods exceeds one day is hereinafter explained.

With the above-described simulation for a shorter lead time, it is assumed that the lead time is one night. The following description is directed to a case in which the lead time is extended from one night to two days.

It is now assumed that the amount of a restocking order $P_{i+2}$ for the (i+1)th day is to be found from the amount for the ith day.

If the amounts of the ith day are to be found, the stock $S_i$ carried over from the preceding day is expressed by the sum of the amount of restocking order for the ith day and the carry-over from the (i-1)th day, that is by $$S_i = P_i + U_{i-1} \qquad (22)$$

whereas the stock amount $Z_i$ for the ith day is expressed by the stock amount $S_i$ from the preceding day less the sale amount $y_i$ for the for the ith day, or $$Z_i = S_i - y_i \qquad (23).$$

The scrapped amount $D_i$ for the ith day is expressed by the amount of goods in $\max\{Z_i, 0\}$ the available period of which has expired (24)

and the amount of lost sale $L_i$ for the ith day is expressed by
$$L_i = \max\{0, -Z_i\} \qquad (25)$$

whereas the carry-over from the ith day to the next day $U_i$ is expressed by $$U_i = \max\{0, Z_i - D_i\} \qquad (26).$$

The various amounts for the (i+1)th day are expressed by $$S_{i+1} = P_{i+1} + U_i \qquad (27)$$

$$Z_{i+1} = S_{i+1} - Y_{i+1} \qquad (28)$$

$D_{i+1}$ = the amount of goods in $\max\{Z_{i+1}, 0\}$ the available period of which has expired (29)

$$U_{i+1} = \max\{0, Z_i - D_{i+1}\} \qquad (30)$$

$$U_{i+1} = \max\{0, Z_{i+1} - D_{i+1}\} \qquad (31)$$

$$P_{i+2} = \max\{Y_{i+2} - U_{i+1} + \alpha, 0\} \qquad (32).$$

In the above formulas, $Y_{i+2}$ and $Y_{i+2}$ are the estimated sale amounts for the (i+1)th day and the (i+2)th day, respectively.

The values of $U_{i+1}$ and $D_{i+1}$ need to be updated from the estimated sale amount $Y_{i+1}$ for the (i+1)the day to the actual amount of sale $Y_{i+1}$ when the actual amount of sale for the (i+1)th day has been determined ultimately.

In this manner, the optimum safety stock amount α may be known from simulation to grasp the estimated reasonable sale amount for the future based on the above-mentioned formula.

Meanwhile, the conventional system for ordering for restocking makes use of an electronic ordering system (EOS). With EOS, a bar code scanner is connected to an input/output device of, for example, a handy terminal. The handy terminal is a device in which data of goods read by bar code scanner, such as article name, minimum ordering unit, price and the amount of current restocking order, are entered and displayed. The personnel in charge of ordering for restocking via handy terminal with the electronic ordering system EOS decides the amount of restocking order for the current time point based on his or her inspiration and experiences and on the state of the inventory of the goods, for placing an order for restocking. Although data transmission and processing by the electronic ordering system EOS downstream of the handy terminal is expedited so that ordering for restocking may be achieved easily, dexterity in inventory control depends with EOS on the skill of the ordering personnel. This means that, with EOS, daily total stock costs depend on the skill of the ordering personnel.

However, under the present supply labor shortage, the ordering operation is taken charge of part-time operators, so that efficient inventory control cannot be achieved.

The present invention proposes a system for ordering for restocking whereby the ordering for restocking may be optimized through estimation of the sale amount of individual articles without dependency on the inspiration or skill of the ordering personnel.

With the system for ordering for restocking, the method for ordering for restocking according to the present invention is introduced into the electronic ordering system as a method for utilizing the method for ordering for restocking more effectively.

Figure 7:
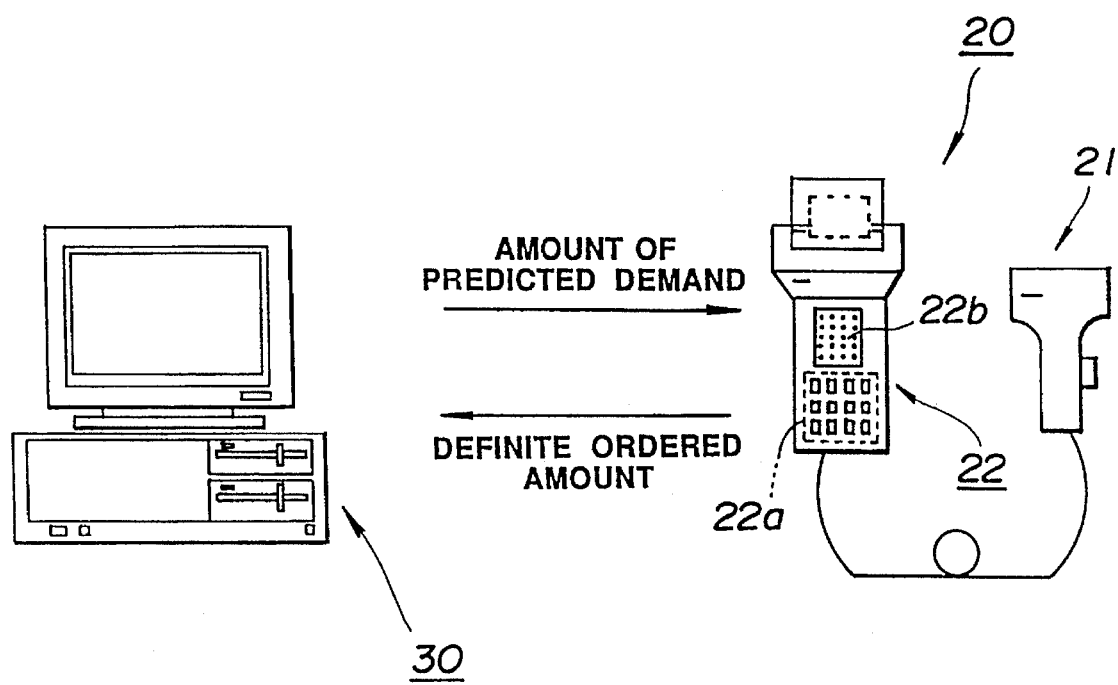
FIG. 7 is an illustrative view for data transmission and reception in case of constructing a system for ordering for restocking using a handy terminal and a personal computer.

Referring to FIG. 7, data transmission and reception in case of constructing the system for ordering for restocking with the aid of the handy terminal and a personal computer is explained. With the present system for ordering for restocking, the handy terminal 20 as part of the electronic ordering system and a personal computer 30 may be interconnected by an RS-232 C type cable or data communication may be made therebetween by radio transmission.

The handy terminal 20, as POS data entry means for entering POS data, comprises a bar code scanner 21 for reading bar codes recording the types of goods and unit prices, and a terminal section 22, which is made up of a data entry section 22a, a data display 22b, a data printing section 22c and a data interfacing section 22d, herein not shown. The handy terminal 20 enters a fixed amount of order of the goods read from the bar code scanner 21 from data entry section 22a to transmit the input data to personal computer 30 via interface section 22d.

The personal computer 30 comprises at least a data arranging processing section for finding sale amount data of individual articles for a predetermined period based on POS data of the individual articles supplied from handy terminal 20, a basic statistic value calculating processing section for calculating the basic statistic values of the daily sale amounts of the individual articles based on the data of the sale amounts of the individual articles, classifying processing section for classifying data of the basic statistic values into preset plural class types, a sale amount estimating processing section for estimating the sale amounts depending on the class types of the goods, and a calculation processing section for calculating the amount of ordering for restocking based on the stock amount and the estimated sale amount of the individual articles.

Referring to individual operations, personal computer 30 classifies the past data in accordance with the above-mentioned system of classifying the statistic sale amount characteristics, while calculating the estimated amount of demand for the goods from the information concerning the current stock amount, minimum units and the fixed amount of order. The estimated amount of demand is supplied to handy terminal 20. Among the results of calculation and parameter data necessary for each restocking order, at least the bar code data, names of goods, stock amount, estimated amount of demand, minimum unit and the fixed amount of order are displayed in the data display section 22b of the handy terminal 20, as shown in FIG. 8. The personnel in charge makes restocking order based on the estimated amount of demand displayed in the display section. It is possible for the personnel in charge to change the amount of restocking based on his or her experiences.

By adding the above-described construction to the electronic ordering system EOS, a definite order quantity to be supplied to personal computer 30, that is, the estimated demand indicated by the remaining stock U and the above Y+α including the optimum safety stock α, obtained from the sale volume of goods for a preset period, may be displayed at the display section 22b of handy terminal 20. Besides, the fixed order amount may be modified based on the experiences etc. of the personnel to achieve semi-automatic high-precision execution of the schedule for ordering for restocking.

Meanwhile, a recording medium, such as a floppy disc, having recorded thereon at least a program for finding data of sale amounts of individual goods for a preset period based on input POS data of the individual goods and calculating basic statistic values of the daily sale amounts of the individual goods based on the data of sale amounts of the individual goods for classifying the data of the basic statistic values into one of preset plural class types in accordance with the above-described procedure may be marketed as a sale amountpredicting software package for estimating the sale amount subject to classification of the goods according to the sale amount characteristics to enable anyone to effect demand estimation of the individual goods easily with high precision and high reliability.

Similarly, a recording medium, such as a floppy disc, having recorded thereon a program for finding data of sale amounts of individual goods for a preset period based on input POS data of the individual goods, calculating basic statistic values of the daily sale amounts of the individual goods based on the data of sale amounts of the individual goods and classifying the data of the basic statistic values into one of preset plural class types and finding and recording a regression formula for predicting the sale amount as a function of the class types may be marketed as a software package for predicting the sale amount for predicting the sale amount subject to classification of sale characteristics of the individual goods to enable any one to effect ordering for restocking and demand estimation of the individual goods with high precision and high reliability even by an unskilled person without experiences in inventory control.

When the above-mentioned software program is run for performing the estimation, it is preferred to discard from sale amount data of individual goods data of individual goods for a day on which there was no stock at the store opening time and for a day on which the goods have become depleted at the store closure time. It is also preferred for the normal type goods to include the normal type, normal 1000 type, lognormal type and lognormal 1000 type, while it is also preferred for the causal type goods to be analyzed based on the linear regression formula or on the logarithmic linear multiple regression formula.

A more concrete example of restocking ordering for T raw noodle is explained, in which inventory simulation is carried out using the electronic ordering system shown in FIG. 7 for deciding the safety stock amount α which will minimize the total stock costs. The sale amount of the T-raw noodles for 82 days is shown in Table 8. The life of the raw noodles is three days.

TABLE 8

Amount of Sale of T Raw Noodles for 82 Days

| 43 | 68 | 105 | 93  | 137 | 170 | 206 | 102 | 19  | 25 |
|----|----|-----|-----|-----|-----|-----|-----|-----|----|
| 30 | 28 | 44  | 47  | 25  | 17  | 36  | 14  | 44  | 47 |
| 13 | 40 | 10  | 38  | 45  | 29  | 51  | 36  | 35  | 39 |
| 39 | 22 | 212 | 102 | 51  | 113 | 112 | 161 | 155 | 30 |
| 30 | 51 | 48  | 86  | 22  | 18  | 34  | 17  | 44  | 30 |
| 42 | 21 | 23  | 20  | 44  | 48  | 24  | 18  | 8   | 29 |
| 14 | 18 | 27  | 13  | 19  | 32  | 29  | 30  | 30  | 34 |
| 13 | 23 | 21  | 12  | 30  | 42  | 24  | 19  | 34  | 17 |
| 19 | 48 |     |     |     |     |     |     |     |    |

According to the above-mentioned classification, the goods are classified under causal type goods. Since the goods are of the causal type, a regression formula 33

$$\text{Sale Amount} = D_0 + \text{day of the week} + \text{weather} + \text{festival} + \text{bargain sale} + D_1 \times \text{temperature} + D_2 \times \text{unit price} \quad (33)$$

having a fixed coefficient $R_2 = 0.89$ is obtained. The standard error of the estimation formula is $\sigma = 10.8$. The values of the days of the week, weather, festival day, temperatures and unit prices, corresponding to the causals, are shown in Table 9.

TABLE 9

| causals | constant term $D_0$ = 371.6556 | |
|---|---|---|
| days of the week | Monday | 0.0000 |
| | Tuesday | −4.5492 |
| | Wednesday | −5.4369 |
| | Thursday | −2.8057 |
| | Friday | 2.4210 |
| | Saturday | 16.8523 |
| | Sunday | 24.9937 |
| whether | fine | 0.0000 |
| | cloudy | 7.9489 |
| | rainy | −3.7489 |
| festival | ordinary | 0.0000 |
| | golden week | −2.7463 |
| | last day of golden week | 190.6128 |
| | pay day | 1.2729 |
| bargain sale | none bargain | 0.0000 |
| | bargain | 45.3226 |
| coefficient | temperature coefficient $D_1$ | −0.9036 |
| | price coefficient $D_2$ | −5.0135 |

Simulation was carried out by assuming six different values of the safety stock amounts α of

α=0, 5, 1, 16, 22, 27 and the purchasers were assumed to purchase the goods displayed in the store regardless of the date stamp. As the results of the simulation, the calculated model values for actual values, actual values and errors between the actual values and the calculated model values are shown in Table 10. The results of simulation for the safety stock values a=5, 11, 16 are shown by numbers "2", "3" and "4" in Tables 11 to 13. The legends 'loss of sale', 'scrapped', 'order' and 'morning' mean 'the number of lost sale', 'the number of scrapped goods', 'the number of orders made' and 'the amount of stocked goods in the morning', respectively. Therefore, 'loss of sale 2', 'scraped 2', 'order 2' and 'morning' mean the number of lost sale, number of scrapped goods, the number of orders made and the amount of stock in the morning', for a=5, respectively.

TABLE 10

| No | real values | model values | error |
|----|-------------|--------------|-------|
| 1  | 43  | 34  | 9   |
| 2  | 68  | 93  | −25 |
| 3  | 105 | 90  | 15  |
| 4  | 93  | 135 | −42 |
| 5  | 137 | 142 | −5  |
| 6  | 170 | 154 | 16  |
| 7  | 206 | 175 | 31  |
| 8  | 102 | 97  | 5   |
| 9  | 19  | 22  | −3  |
| 10 | 25  | 31  | −6  |
| 11 | 30  | 25  | 5   |
| 12 | 28  | 29  | −1  |
| 13 | 44  | 11  | 33  |
| 14 | 47  | 52  | −5  |
| 15 | 25  | 22  | 3   |
| 16 | 17  | 22  | −5  |
| 17 | 36  | 34  | 2   |
| 18 | 14  | 41  | −27 |
| 19 | 44  | 56  | −12 |
| 20 | 47  | 53  | −6  |
| 21 | 13  | 31  | −18 |
| 22 | 40  | 23  | 17  |
| 23 | 10  | 20  | −10 |
| 24 | 38  | 24  | 14  |
| 25 | 45  | 35  | 10  |
| 26 | 29  | 43  | −14 |
| 27 | 51  | 59  | −8  |
| 28 | 36  | 20  | 16  |
| 29 | 35  | 36  | −1  |
| 30 | 39  | 28  | 11  |
| 31 | 39  | 42  | −3  |
| 32 | 22  | 46  | −24 |
| 33 | 212 | 212 | 0   |
| 34 | 102 | 102 | 0   |
| 35 | 51  | 99  | −48 |
| 36 | 113 | 113 | 0   |
| 37 | 112 | 109 | 3   |
| 38 | 161 | 124 | 37  |
| 39 | 155 | 132 | 23  |
| 40 | 30  | 22  | 8   |
| 41 | 30  | 16  | 14  |
| 42 | 51  | 35  | 16  |
| 43 | 48  | 40  | 8   |
| 44 | 86  | 59  | 27  |
| 45 | 22  | 23  | −1  |
| 46 | 18  | 15  | 3   |
| 47 | 34  | 30  | 4   |
| 48 | 17  | 37  | −20 |
| 49 | 44  | 56  | −12 |
| 50 | 30  | 33  | −3  |
| 51 | 42  | 27  | 15  |
| 52 | 21  | 25  | −4  |
| 53 | 23  | 20  | 3   |
| 54 | 20  | 25  | −5  |
| 55 | 44  | 45  | −1  |
| 56 | 48  | 41  | 7   |
| 57 | 24  | 28  | −4  |
| 58 | 18  | 23  | −5  |
| 59 | 8   | 13  | −5  |
| 60 | 29  | 27  | 2   |
| 61 | 14  | 21  | −7  |
| 62 | 18  | 34  | −16 |
| 63 | 27  | 41  | −14 |
| 64 | 13  | 27  | −14 |
| 65 | 19  | 21  | −2  |
| 66 | 32  | 12  | 20  |
| 67 | 29  | 22  | 7   |
| 68 | 30  | 21  | 9   |

TABLE 10-continued

| No | real values | model values | error |
|---|---|---|---|
| 69 | 30 | 36 | −6 |
| 70 | 34 | 41 | −7 |
| 71 | 13 | 19 | −6 |
| 72 | 23 | 22 | 1 |
| 73 | 21 | 16 | 5 |
| 74 | 12 | 20 | −8 |
| 75 | 30 | 35 | −5 |
| 76 | 42 | 52 | −10 |
| 77 | 24 | 18 | 6 |
| 78 | 19 | 14 | 5 |
| 79 | 34 | 10 | 24 |
| 80 | 17 | 13 | 4 |
| 81 | 19 | 35 | −16 |
| 82 | | | |

TABLE 11

| No | loss of sale 2 | scrap ped 2 | order 2 | morning 2 |
|---|---|---|---|---|
| 1 | 4 | 0 | 98 | 43 |
| 2 | 0 | 0 | 65 | 98 |
| 3 | 10 | 0 | 141 | 95 |
| 4 | 0 | 0 | 99 | 141 |
| 5 | 0 | 0 | 149 | 147 |
| 6 | 11 | 0 | 180 | 159 |
| 7 | 26 | 0 | 102 | 180 |
| 8 | 0 | 0 | 27 | 102 |
| 9 | 0 | 0 | 28 | 27 |
| 10 | 0 | 0 | 19 | 36 |
| 11 | 0 | 0 | 35 | 30 |
| 12 | 0 | 0 | 9 | 35 |
| 13 | 28 | 0 | 57 | 16 |
| 14 | 0 | 0 | 17 | 57 |
| 15 | 0 | 0 | 26 | 27 |
| 16 | 0 | 1 | 30 | 28 |
| 17 | 0 | 1 | 43 | 40 |
| 18 | 0 | 1 | 31 | 46 |
| 19 | 0 | 1 | 41 | 62 |
| 20 | 0 | 2 | 27 | 58 |
| 21 | 0 | 2 | 7 | 36 |
| 22 | 12 | 0 | 26 | 28 |
| 23 | 0 | 0 | 13 | 26 |
| 24 | 9 | 0 | 41 | 29 |
| 25 | 4 | 0 | 49 | 41 |
| 26 | 0 | 0 | 44 | 49 |
| 27 | 0 | 0 | 13 | 64 |
| 28 | 10 | 0 | 41 | 26 |
| 29 | 0 | 0 | 27 | 41 |
| 30 | 6 | 0 | 47 | 33 |
| 31 | 0 | 0 | 44 | 47 |
| 32 | 0 | 0 | 187 | 52 |
| 33 | 0 | 1 | 104 | 217 |
| 34 | 0 | 1 | 99 | 108 |
| 35 | 0 | 1 | 67 | 104 |
| 36 | 0 | 1 | 109 | 119 |
| 37 | 0 | 1 | 129 | 114 |
| 38 | 31 | 0 | 137 | 130 |
| 39 | 18 | 0 | 28 | 137 |
| 40 | 2 | 0 | 21 | 28 |
| 41 | 9 | 0 | 40 | 21 |
| 42 | 11 | 0 | 45 | 40 |
| 43 | 3 | 0 | 64 | 45 |
| 44 | 22 | 0 | 28 | 64 |
| 45 | 0 | 0 | 14 | 28 |
| 46 | 0 | 0 | 33 | 20 |
| 47 | 0 | 1 | 42 | 35 |
| 48 | 0 | 0 | 36 | 42 |
| 49 | 0 | 0 | 22 | 61 |
| 50 | 0 | 2 | 26 | 39 |
| 51 | 9 | 0 | 31 | 33 |
| 52 | 0 | 0 | 15 | 31 |
| 53 | 0 | 0 | 29 | 25 |
| 54 | 0 | 1 | 41 | 31 |
| 55 | 0 | 1 | 41 | 51 |

TABLE 11-continued

| No | loss of sale 2 | scrap ped 2 | order 2 | morning 2 |
|---|---|---|---|---|
| 56 | 1 | 0 | 34 | 47 |
| 57 | 0 | 0 | 19 | 34 |
| 58 | 0 | 0 | 7 | 29 |
| 59 | 0 | 3 | 25 | 18 |
| 60 | 0 | 1 | 24 | 32 |
| 61 | 0 | 1 | 29 | 26 |
| 62 | 0 | 1 | 25 | 40 |
| 63 | 0 | 3 | 17 | 46 |
| 64 | 0 | 5 | 12 | 33 |
| 65 | 0 | 2 | 11 | 27 |
| 66 | 15 | 0 | 27 | 17 |
| 67 | 2 | 0 | 26 | 27 |
| 68 | 4 | 0 | 41 | 26 |
| 69 | 0 | 0 | 36 | 41 |
| 70 | 0 | 0 | 12 | 47 |
| 71 | 0 | 2 | 17 | 25 |
| 72 | 0 | 1 | 18 | 27 |
| 73 | 0 | 0 | 25 | 21 |
| 74 | 0 | 0 | 28 | 25 |
| 75 | 0 | 0 | 46 | 41 |
| 76 | 0 | 2 | 11 | 57 |
| 77 | 0 | 0 | 19 | 24 |
| 78 | 0 | 0 | 15 | 19 |
| 79 | 19 | 0 | 18 | 15 |
| 80 | 0 | 0 | 40 | 18 |
| 81 | 0 | 0 | 35 | 41 |
| 82 | | | | |

TABLE 12

| No | loss of sale 3 | scrap ped 3 | order 3 | morning 3 |
|---|---|---|---|---|
| 1 | 0 | 0 | 102 | 43 |
| 2 | 0 | 0 | 64 | 104 |
| 3 | 5 | 0 | 146 | 100 |
| 4 | 0 | 0 | 100 | 146 |
| 5 | 0 | 0 | 149 | 153 |
| 6 | 5 | 0 | 186 | 165 |
| 7 | 20 | 0 | 107 | 186 |
| 8 | 0 | 0 | 28 | 107 |
| 9 | 0 | 0 | 28 | 33 |
| 10 | 0 | 2 | 20 | 42 |
| 11 | 0 | 1 | 36 | 35 |
| 12 | 0 | 1 | 11 | 40 |
| 13 | 22 | 0 | 62 | 22 |
| 14 | 0 | 0 | 18 | 62 |
| 15 | 0 | 0 | 25 | 33 |
| 16 | 0 | 2 | 31 | 33 |
| 17 | 0 | 1 | 44 | 45 |
| 18 | 0 | 3 | 32 | 52 |
| 19 | 0 | 2 | 43 | 67 |
| 20 | 0 | 3 | 28 | 64 |
| 21 | 0 | 3 | 8 | 42 |
| 22 | 6 | 0 | 31 | 34 |
| 23 | 0 | 0 | 13 | 31 |
| 24 | 4 | 0 | 46 | 34 |
| 25 | 0 | 0 | 53 | 46 |
| 26 | 0 | 0 | 45 | 54 |
| 27 | 0 | 1 | 13 | 70 |
| 28 | 5 | 0 | 46 | 31 |
| 29 | 0 | 0 | 28 | 46 |
| 30 | 0 | 0 | 52 | 39 |
| 31 | 0 | 0 | 44 | 52 |
| 32 | 0 | 0 | 188 | 57 |
| 33 | 0 | 1 | 103 | 223 |
| 34 | 0 | 1 | 100 | 113 |
| 35 | 0 | 1 | 66 | 110 |
| 36 | 0 | 1 | 110 | 124 |
| 37 | 0 | 1 | 128 | 120 |
| 38 | 26 | 0 | 142 | 135 |
| 39 | 13 | 0 | 33 | 142 |
| 40 | 0 | 0 | 24 | 33 |
| 41 | 3 | 0 | 45 | 27 |

TABLE 12-continued

| No | loss of sale 3 | scrap ped 3 | order 3 | morning 3 |
|---|---|---|---|---|
| 42 | 6 | 0 | 51 | 45 |
| 43 | 0 | 0 | 67 | 51 |
| 44 | 16 | 0 | 33 | 70 |
| 45 | 0 | 0 | 15 | 33 |
| 46 | 0 | 0 | 33 | 26 |
| 47 | 0 | 1 | 42 | 41 |
| 48 | 0 | 1 | 36 | 48 |
| 49 | 0 | 2 | 24 | 66 |
| 50 | 0 | 3 | 27 | 44 |
| 51 | 4 | 0 | 36 | 38 |
| 52 | 0 | 0 | 16 | 36 |
| 53 | 0 | 0 | 28 | 31 |
| 54 | 0 | 2 | 42 | 36 |
| 55 | 0 | 1 | 41 | 56 |
| 56 | 0 | 1 | 36 | 52 |
| 57 | 0 | 1 | 20 | 39 |
| 58 | 0 | 1 | 9 | 34 |
| 59 | 0 | 5 | 27 | 24 |
| 60 | 0 | 2 | 24 | 38 |
| 61 | 0 | 2 | 30 | 31 |
| 62 | 0 | 2 | 26 | 45 |
| 63 | 0 | 4 | 18 | 51 |
| 64 | 0 | 6 | 13 | 38 |
| 65 | 0 | 4 | 14 | 32 |
| 66 | 9 | 0 | 32 | 23 |
| 67 | 0 | 0 | 29 | 32 |
| 68 | 0 | 0 | 44 | 32 |
| 69 | 0 | 1 | 37 | 46 |
| 70 | 0 | 1 | 13 | 52 |
| 71 | 0 | 3 | 19 | 30 |
| 72 | 0 | 3 | 19 | 33 |
| 73 | 0 | 1 | 27 | 26 |
| 74 | 0 | 1 | 28 | 31 |
| 75 | 0 | 1 | 47 | 46 |
| 76 | 0 | 2 | 11 | 62 |
| 77 | 0 | 1 | 20 | 29 |
| 78 | 0 | 1 | 17 | 24 |
| 79 | 13 | 0 | 24 | 21 |
| 80 | 0 | 0 | 39 | 24 |
| 81 | 0 | 0 | 36 | 46 |
| 82 | | | | |

TABLE 13

| No | loss of sale 4 | scrap ped 4 | order 4 | morning 4 |
|---|---|---|---|---|
| 1 | 0 | 0 | 102 | 43 |
| 2 | 0 | 0 | 65 | 109 |
| 3 | 0 | 1 | 151 | 106 |
| 4 | 0 | 0 | 100 | 151 |
| 5 | 0 | 0 | 149 | 158 |
| 6 | 0 | 0 | 191 | 170 |
| 7 | 15 | 0 | 113 | 191 |
| 8 | 0 | 0 | 27 | 113 |
| 9 | 0 | 0 | 28 | 38 |
| 10 | 0 | 3 | 22 | 47 |
| 11 | 0 | 2 | 37 | 41 |
| 12 | 0 | 2 | 11 | 46 |
| 13 | 17 | 0 | 68 | 27 |
| 14 | 0 | 0 | 17 | 68 |
| 15 | 0 | 0 | 26 | 38 |
| 16 | 0 | 5 | 33 | 39 |
| 17 | 0 | 1 | 44 | 50 |
| 18 | 0 | 4 | 33 | 57 |
| 19 | 0 | 3 | 44 | 72 |
| 20 | 0 | 5 | 30 | 69 |
| 21 | 0 | 3 | 8 | 47 |
| 22 | 1 | 0 | 36 | 39 |
| 23 | 0 | 0 | 14 | 36 |
| 24 | 0 | 0 | 50 | 40 |
| 25 | 0 | 1 | 54 | 52 |
| 26 | 0 | 0 | 44 | 60 |
| 27 | 0 | 2 | 15 | 75 |

TABLE 13-continued

| No | loss of sale 4 | scrap ped 4 | order 4 | morning 4 |
|---|---|---|---|---|
| 28 | 0 | 1 | 52 | 37 |
| 29 | 0 | 0 | 27 | 52 |
| 30 | 0 | 0 | 53 | 44 |
| 31 | 0 | 1 | 44 | 58 |
| 32 | 0 | 1 | 189 | 62 |
| 33 | 0 | 1 | 103 | 228 |
| 34 | 0 | 1 | 100 | 118 |
| 35 | 0 | 2 | 68 | 115 |
| 36 | 0 | 2 | 110 | 130 |
| 37 | 0 | 1 | 128 | 125 |
| 38 | 21 | 0 | 148 | 140 |
| 39 | 7 | 0 | 38 | 148 |
| 40 | 0 | 0 | 24 | 38 |
| 41 | 0 | 0 | 49 | 32 |
| 42 | 0 | 0 | 56 | 51 |
| 43 | 0 | 0 | 67 | 56 |
| 44 | 11 | 0 | 39 | 75 |
| 45 | 0 | 0 | 14 | 39 |
| 46 | 0 | 0 | 33 | 31 |
| 47 | 0 | 3 | 44 | 46 |
| 48 | 0 | 2 | 38 | 53 |
| 49 | 0 | 2 | 23 | 72 |
| 50 | 0 | 5 | 29 | 49 |
| 51 | 0 | 1 | 42 | 43 |
| 52 | 0 | 0 | 15 | 42 |
| 53 | 0 | 0 | 28 | 36 |
| 54 | 0 | 5 | 46 | 41 |
| 55 | 0 | 1 | 40 | 62 |
| 56 | 0 | 1 | 36 | 57 |
| 57 | 0 | 2 | 22 | 44 |
| 58 | 0 | 2 | 9 | 40 |
| 59 | 0 | 7 | 29 | 29 |
| 60 | 0 | 3 | 26 | 43 |
| 61 | 0 | 2 | 29 | 37 |
| 62 | 0 | 4 | 29 | 50 |
| 63 | 0 | 6 | 20 | 57 |
| 64 | 0 | 8 | 15 | 44 |
| 65 | 0 | 5 | 14 | 38 |
| 66 | 4 | 0 | 38 | 28 |
| 67 | 0 | 0 | 28 | 38 |
| 68 | 0 | 0 | 45 | 37 |
| 69 | 0 | 1 | 37 | 52 |
| 70 | 0 | 2 | 14 | 58 |
| 71 | 0 | 6 | 21 | 36 |
| 72 | 0 | 4 | 21 | 38 |
| 73 | 0 | 2 | 27 | 32 |
| 74 | 0 | 2 | 29 | 36 |
| 75 | 0 | 2 | 49 | 51 |
| 76 | 0 | 4 | 12 | 68 |
| 77 | 0 | 2 | 22 | 34 |
| 78 | 0 | 2 | 17 | 30 |
| 79 | 8 | 0 | 29 | 26 |
| 80 | 0 | 0 | 39 | 29 |
| 81 | 0 | 0 | 36 | 51 |
| 82 | | | | |

The statistic data for Tables 10 and 11 to 13 are shown collectively in Table 14.

TABLE 14

| safe stock $\alpha$ for | average | | | | |
|---|---|---|---|---|---|
| | number of lost sales | number of scrapped goods | number of ordered goods | number of stocked goods | residuals at night |
| $\alpha = 0$ | 5.3 | 0.2 | 41.2 | 46.4 | 5.1 |
| $\alpha = 5$ | 3.2 | 0.5 | 43.7 | 51.7 | 8.0 |
| $\alpha = 11$ | 1.9 | 1.0 | 45.5 | 57.0 | 11.6 |
| $\alpha = 16$ | 1.0 | 1.6 | 47.0 | 62.4 | 15.4 |
| $\alpha = 22$ | 0.6 | 2.5 | 48.3 | 67.6 | 19.3 |
| $\alpha = 27$ | 0.2 | 3.5 | 49.6 | 72.9 | 23.3 |

If the costs of each loss of chance, scrap costs and stock costs for each article are ¥20, ¥60 and ¥0, respectively, the total stock costs per day are as shown in Table 15:

TABLE 15

| safe stock amount α for | total daily stock costs |
|---|---|
| α = 0 | ¥ 118 |
| α = 5 | ¥ 94 |
| α = 11 | ¥ 98 |
| α = 16 | ¥ 116 |
| α = 22 | ¥ 162 |
| α = 27 | ¥ 214 |

It is seen from Table 15 that the optimum safety stock amount corresponding to the least total stock costs is five.

By adding the above-described functions based on the method for ordering for restocking to a handy terminal as a part of the electronic ordering system, the following advantages are derived.

First, in distinction from the conventional practice in which processing for estimation was complicated because of the absence of the classification of goods into variation and stable types, estimation of the amount of demand may be achieved with certain accuracy because sale characteristics of goods may be analyzed in advance. On the other hand, fluctuations in accuracy may be decreased by not relying upon inspiration or experiences of the operators.

Second, the overall stock costs may be lowered by deciding an optimum safety stock amount by simulation employing past data.

Third, the operation of ordering for restocking by the ordering personnel may be facilitated by adding a new function of automatically calculating the amount of restocking orders by the handy terminal, while the operation may be expedited. Above all, the operation of ordering for restocking which should require high degree of skill may be taken charge of by part timers or unexperienced personnel. In this manner, the schedule of ordering for restocking may be carried out semi-automatically to diminish the costs and the time necessary for ordering for restocking.

The present invention is not limited to the above-described embodiments. For example, the numbers of visitors and causal data from each store may be entered into a host computer at the main office or a computer center to effect simulation of the restocking orders or estimation of sale amounts and the results of optimum amounts of orders for restocking may be transmitted to each store. The system construction may be so made that data may be communicated between computer terminals provided in each store and the host computer for collective information control so that daily POS data may be automatically entered to the host computer for checking or estimation analyses and model regression formulas may be updated automatically.

We claim:

1. A sale amount prediction method comprising the steps of:

entering POS data into a point-of-sale terminal;

calculating, within a computer and based upon the entered POS data, sale amount data of the individual goods for a predetermined time period;

calculating, within the computer and based upon the calculated sale amount data, a plurality of basic statistic parameters of daily sale amounts of said individual goods;

classifying, within the computer and based on said calculated basic statistic values, said individual goods by determining into which of a Poisson type, a normal type, a causal type, and another type not belonging to one of these types, the daily sale amount of the individual goods belongs; and predicting the sale amount of the individual goods based upon a characteristic value of the type into which the daily sale amount of the individual goods is classified.

2. The sale amount prediction method according to claim 1 wherein, prior to calculation of the basic statistic parameters, data of individual goods for a day when such individual goods are already depleted on store opening and data of individual goods for a day when such individual goods are depleted on store closure are discarded from the sale amount data of the individual goods and the basic statistic parameters of the daily sale amount for the individual goods are calculated based on the daily sale amount data of the individual goods after such discarding.

3. The sale amount prediction method according to claim 1 wherein, prior to calculation of the basic statistic parameters, data of goods not displayed routinely and data of scrapped goods are discarded and the basic statistic parameters of the daily sale amount for the individual goods are calculated based on the daily sale amount data of the individual goods after such discarding.

4. A sale amount prediction system comprising:

POS data entry means for entering POS data;

sale amount data calculating means for calculating sale amount data of individual goods over a predetermined time period based on POS data not entered via said POS data entry means;

basic statistic parameter calculating means for calculating basic statistic parameters of daily sale amounts of said individual goods based on the sale amount data of said individual goods calculated by said sale amount calculating means; and means for classifying said individual goods by verifying, based upon the basic statistic parameters calculated by said basic statistic parameter calculating means, into which of a Poisson type, a normal type, a casual type, and an other type not belonging to these types, belongs the daily sale amount of the individual articles, to classify the individual goods; and sale amount prediction means for predicting a sale amount of the individual goods based upon characteristic values of the type into which the individual goods are classified by said classifying means.

5. The sale amount prediction system according to claim 4, further including means for calculating the amount of a restocking order based on the estimated sale amount and an amount on stock.

6. The sale amount prediction system according to claim 5 wherein said means for calculating the amount of a restocking order is provided in a hand-held terminal for inputting a stock amount of each individual goods, data of the estimated sale amount from said means for estimating the sale amount being transmitted to said means for calculating the amount of the restocking order for calculating the amount of the restocking order, and wherein the results of calculation are displayed on a display part of said hand-held terminal.

7. The sale amount prediction system for classifying individual goods according to claim 4 wherein, prior to calculation of the basic statistic parameters, data of individual goods for a day when such individual goods are already depleted on store opening and data of individual goods for a day when such individual goods are depleted on store closure are discarded from the sale quantity data of the individual goods and the basic statistic parameters of the daily sale amount for the individual goods are calculated based on the daily sale amount data of the individual goods after such discarding.

8. The sale amount prediction system according to claim 4, wherein the sale amount prediction means classifies the daily sale amount of the individual goods into one of a normal type which depends only upon the sale amount, a normal type which depends on the sale amount per a predetermined unit number of guest, a lognormal type which depends on the logarithm of the sale amount; and a lognormal type which depends on the logarithm of the sale amount per a predetermined unit number of guests.

9. The sale amount prediction system according to claim 4, wherein the classifying means includes:

Poisson type distribution means for determining, by a linear regression formula employing the basic statistic parameters calculated by said basic statistic parameter calculating means, whether the daily sale amount of the individual goods fit a Poisson distribution and, if the result is affirmative, for setting the daily sale amount as the Poisson type;

normal type distribution means for determining, by chi-square testing employing the basic statistic parameters calculated by said basic statistic parameter calculating means, whether the daily sale amount of the individual goods fit into a normal distribution and, if the result is affirmative, for setting the daily sale amount as the normal type;

causal type distribution means for determining whether coefficients of each causal in the linear regression formula is larger than a predetermined value and, if the result is affirmative, for setting the daily sale amount as the causal type; and other type distribution means for setting the daily sale amount as the other type when the daily sale amount is not set to one of the Poisson type, the normal type, and the causal type.

10. The sale amount prediction system according to claim 4, wherein the sale amount predicting means sets the characteristic values as mean value for the Poisson type, mean value and standard deviation for the normal type, linear multiple regression formula, mean value and standard deviation for the causal type, and mean value and standard deviation for the other type.

11. The sale amount prediction method according to claim 1 wherein the plurality of basic statistic parameters includes a mean value, a standard deviation, a maximum value, a minimum value, a skewness value, a kurtosis value and a Geary value.

12. The sale amount prediction method according to claim 1 wherein the classifying step includes:

determining by linear multiple regression formula employing said basic statistic parameters, whether the daily sale amount of the individual goods fits a Poisson distribution and, if the result is affirmative, classifying the daily sale amount of the individual goods as the Poisson type;

otherwise, determining by chi-square testing employing the said basic statistic parameters, whether the daily sale amount of the individual goods fits a normal distribution and, if the result is affirmative, classifying the daily sale amount of the individual goods as a normal type;

otherwise, determining whether a coefficient of each casual in a linear multiple regression formula employing the daily sale amount of the individual goods is larger than a pre-set value and, if the result is affirmative, classifying the daily sale amount of the individual goods as a casual type; and otherwise, classifying the daily sale amount of the individual goods as an other type.

13. The sale amount prediction method according to claim 1 wherein the predicting step includes predicting the sale amount of the individual goods with said characteristic value being a mean value when the type into which the daily sale amount of the individual goods is the Poisson type, predicting the sale amount of the individual goods with said characteristic value including a mean value and a standard deviation when the type into which the daily sale amount of the individual goods is the normal type, predicting the sale amount of the individual goods with said characteristic value including a linear multiple regression formula when the type into which the daily sale amount of the individual goods is the causal type, and predicting the sale amount of the individual goods with said characteristic value including a mean value and standard deviation when the type into which the daily sale amount of the individual goods is the other type.

14. The sale amount prediction method according to claim 1, wherein the normal type is one of a normal type based only upon the sale amount, a normal type based upon the sale amount for preset numbers of guests, a lognormal type based upon the log of the sale amount and a normal type based upon the log of the sale amount for preset numbers of guests.

15. The sale amount prediction system according to claim 4 wherein said basic statistic parameter calculating means calculates, based upon the sale amount data of individual goods calculated by said sale amount calculating means, a mean value, a standard deviation, a maximum value, a minimum value, a skewness value, a kurtosis value and a Geary value.

16. The sale amount prediction method according to claim 4, wherein the sale amount data of individual goods not consistently displayed and individual goods which are scrapped is removed from the sale amount data of the individual goods by said sale amount data calculating means, and the basic statistic parameters of the daily sale amount for the individual goods are calculated based on the daily sale amount data of the individual goods after such discarding.

* * * * *